US012603033B2

(12) United States Patent
Wen et al.

(10) Patent No.: US 12,603,033 B2
(45) Date of Patent: Apr. 14, 2026

(54) SCANNING IMAGE DATA TO AN ARRAY OF PIXELS AT AN INTERMEDIATE SCAN RATE DURING A TRANSITION BETWEEN DIFFERENT REFRESH RATES

(71) Applicant: Google LLC, Mountain View, CA (US)

(72) Inventors: Chien-Hui Wen, Mountain View, CA (US); John William Kaehler, Mountain View, CA (US); Sang Young Youn, Mountain View, CA (US); Ken Kok Foo, Mountain View, CA (US)

(73) Assignee: Google LLC, Mountain View, CA (US)

(*) Notice: Subject to any disclaimer, the term of this patent is extended or adjusted under 35 U.S.C. 154(b) by 225 days.

(21) Appl. No.: 18/278,252

(22) PCT Filed: Nov. 21, 2022

(86) PCT No.: PCT/US2022/050615
§ 371 (c)(1),
(2) Date: Aug. 22, 2023

(87) PCT Pub. No.: WO2024/112322
PCT Pub. Date: May 30, 2024

(65) Prior Publication Data
US 2025/0037635 A1 Jan. 30, 2025

(51) Int. Cl.
*G06F 3/038* (2013.01)
*G09G 3/20* (2006.01)
(Continued)

(52) U.S. Cl.
CPC ......... *G09G 3/2092* (2013.01); *G09G 3/3233* (2013.01); *G09G 3/3266* (2013.01);
(Continued)

(58) Field of Classification Search
CPC ... G09G 3/2092; G09G 3/3233; G09G 3/3266
(Continued)

(56) References Cited

U.S. PATENT DOCUMENTS 8,836,733 B2 9/2014 Lee et al.
9,142,188 B2 9/2015 Kurikko
(Continued)

FOREIGN PATENT DOCUMENTS

CN 113053306 6/2021
KR 10-2021-0085874 7/2021
(Continued)

OTHER PUBLICATIONS

International Preliminary Report on Patentability in International Appln. No. PCT/US2022/050615, mailed on Jun. 5, 2025, 14 pages.
(Continued)

*Primary Examiner* — Jonathan M Blancha
(74) *Attorney, Agent, or Firm* — Fish & Richardson P.C.

(57) ABSTRACT

In general, the subject matter described in this disclosure can be embodied in technology for operating a display device that includes a pixel array. A first frame is programmed to the array, while the display device is operating at a first refresh rate, including by scanning the first frame line-by-line to the pixel array at a first scan rate. An indication that the display device is to transition from the first refresh rate to a second refresh rate is received. An intermediate frame is then programmed to the pixel array, including by scanning the intermediate frame line-by-line to the pixel array at an intermediate scan rate. A second frame is then programmed to the pixel array, while the display device is operating at the second refresh rate, including by scanning the second frame line-by-line to the pixel array at the second scan rate.

20 Claims, 12 Drawing Sheets

(51) Int. Cl.
*G09G 3/3233* (2016.01)
*G09G 3/3266* (2016.01)

(52) U.S. Cl.
CPC ............... *G09G 2300/0819* (2013.01); *G09G 2300/0852* (2013.01); *G09G 2300/0861* (2013.01); *G09G 2310/0245* (2013.01); *G09G 2310/0262* (2013.01); *G09G 2320/0247* (2013.01); *G09G 2320/0673* (2013.01); *G09G 2340/0435* (2013.01)

(58) Field of Classification Search
USPC .......................................................... 345/214
See application file for complete search history.

(56) References Cited

U.S. PATENT DOCUMENTS

| | | | | |
|---|---|---|---|---|
| 2016/0119625 | A1* | 4/2016 | Li | H04N 21/234381 725/116 |
| 2021/0201823 | A1 | 7/2021 | Han et al. | |
| 2021/0248957 | A1 | 8/2021 | Lee et al. | |
| 2022/0366852 | A1* | 11/2022 | Jeong | G09G 5/10 |
| 2022/0406263 | A1* | 12/2022 | Han | G09G 3/3275 |
| 2023/0077843 | A1* | 3/2023 | Xin | G09G 5/363 345/545 |

FOREIGN PATENT DOCUMENTS

| | | |
|---|---|---|
| KR | 10-2022-0014366 | 2/2022 |
| WO | WO 2021201844 | 10/2021 |
| WO | WO 2022151934 | 7/2022 |

OTHER PUBLICATIONS

International Search Report and Written Opinion in International Appln. No. PCT/US2022/050615, mailed on May 11, 2023, 19 pages.
Youn et al., "Image Data Compensation to Prevent Display Artifacts on an OLED Display," Technical Disclosure Commons, Sep. 23, 2021, 8 pages.
Office Action in Korean Appln. No. 10-2025-7012347, mailed on Dec. 16, 2025, 13 pages (with English translation).

* cited by examiner

| Frame No. | 1 | 2 | 3 | 4 | 5 | 6 | 7 | 8 | 9 | 10 | 11 |
|---|---|---|---|---|---|---|---|---|---|---|---|
| Frame Type | NS | I-1 | I-2 | I-3 | I-4 | I-5 | I-6 | I-7 | I-8 | I-9 | HS |
| Scan Rate | *f* | 1.1 *f* | 1.2 *f* | 1.3 *f* | 1.4 *f* | 1.5 *f* | 1.6 *f* | 1.7 *f* | 1.8 *f* | 1.9 *f* | 2 *f* |
| Frame Length (1/Hz) | 60 | 66 | 72 | 78 | 84 | 90 | 96 | 102 | 108 | 114 | 120 |
| Gamma | A | B | C | D | E | F | G | H | I | J | K |

Refresh Rate Transition

SCANNING IMAGE DATA TO AN ARRAY OF PIXELS AT AN INTERMEDIATE SCAN RATE DURING A TRANSITION BETWEEN DIFFERENT REFRESH RATES

CROSS-REFERENCE TO RELATED APPLICATION

This application claims priority to PCT Application No. PCT/US2022/050615 filed Nov. 21, 2022, the disclosures of which are incorporated herein.

TECHNICAL FIELD

This document generally relates to display device operation.

BACKGROUND

Some electronic devices with a display device can operate the display device at multiple different refresh rates, such that the electronic device can update frames of visual content at the different refresh rates. For example, a display device can update image content at a relatively-low refresh rate (e.g., 60 Hz) when presenting a user interface of a word-processing application, while the same display device can update image content at a relatively-high refresh rate (e.g., 120 Hz) when presenting a user interface of a game that provides an immersive visual experience.

SUMMARY

This document describes techniques, methods, systems, and other mechanisms for scanning image data to an array of pixels at an intermediate scan rate during a transition between different refresh rates.

A display device of a computing device can be configured to present frames of image content at a first refresh rate and at a second refresh rate. When presenting frames of image content at the first refresh rate, the display device may program the frames of image content to an array of pixels at a first scan rate. When presenting frames of image content at the second refresh rate, the display device may program the frames of image content to the array of pixels at a second scan rate that is different from the first scan rate.

Upon the computing device making a determination to switch from the first refresh rate to the second refresh rate, the computing device can present one or more frames of image content during an intermediate transition period. The display device can program the one or more frames of image content to be presented during the intermediate transition period to the array of pixels, by scanning such one or more frames of image content to the array of pixels at an intermediate scan rate that is between the first scan rate and the second scan rate.

Particular implementations can, in certain instances, realize one or more of the following advantages. Scanning frames of image content to an array of pixels at different refresh rates can provide for energy savings, which can extend battery life of a mobile computing device. An oscillator that produces a clock signal which defines a scan rate at which image content is scanned line-by-line to the array of pixels can operate at a particular scan rate for a particular refresh rate. Upon the computing device switching to a lower refresh rate, the oscillator can output the clock signal at a lower frequency, such that the scan rate at which image content is scanned to the array of pixels is also lower.

Operating the clock signal at an intermediate frequency during a transition between the refresh rates can avoid visual artifacts (e.g., a user-perceptible flicker) that may otherwise appear during the transition between refresh rates.

As additional description to the embodiments described below, the present disclosure describes the following embodiments.

Embodiment 1 is a method of operating a display device that includes an array of pixels, the method comprising: programming a first frame of image content to the array of pixels, while the display device is operating at a first refresh rate in which image content presented by the array of pixels is refreshed at the first refresh rate, including by scanning the first frame of image content line-by-line to the array of pixels at a first scan rate; activating the array of pixels to present the first frame of image content that was scanned to the array of pixels at the first scan rate; receiving an indication that the display device is to transition from the first refresh rate to a second refresh rate in which image content presented by the array of pixels is refreshed at the second refresh rate; programming, responsive to receiving the indication that the display device is to transition from the first refresh rate to the second refresh rate, an intermediate frame of image content to the array of pixels, including by scanning the intermediate frame of image content line-by-line to the array of pixels at an intermediate scan rate that is between the first scan rate and a second scan rate; activating the array of pixels to present the intermediate frame of image content that was scanned to the array of pixels at the intermediate scan rate; programming a second frame of image content to the array of pixels, after the display device has presented the intermediate frame of image content and while the display device is operating at the second refresh rate, including by scanning the second frame of image content line-by-line to the array of pixels at the second scan rate; and activating the array of pixels to present the second frame of image content that was scanned to the array of pixels at the second scan rate.

Embodiment 2 is the method of embodiment 1, wherein: the first frame, the intermediate frame, and the second frame are frames in a sequence of frames presented by the display device.

Embodiment 3 is the method of any one of embodiments 1 through 2, wherein: scanning the first frame of image content line-by-line to the array of pixels at the first scan rate includes: (i) scanning a first line of the first frame of image content to a first line of the array if pixels at a first time; and (ii) scanning a second line of the first frame of image content to a second line of the array if pixels at a second time; and a difference between the first time and the second time is defined by the first scan rate.

Embodiment 4 is the method of any one of embodiments 1 through 3, wherein: the first refresh rate is lower than the second refresh rate; the first scan rate is lower than the intermediate scan rate; and the second scan rate is higher than the intermediate scan rate.

Embodiment 5 is the method of embodiment 4, wherein: the first refresh rate is a frequency between 60 Hz and 100 Hz; and the second refresh rate is twice the first refresh rate.

Embodiment 6 is the method of any one of embodiments 4 through 5, wherein: the display device presents the first frame of image content with a first number of distinct activations; and the display device presents the second frame of image content with a second number of distinct activations that is less than the first number of distinct activations.

Embodiment 7 is the method of embodiment 6, wherein: the display device presents the intermediate frame of image content with an intermediate number of refresh periods that is less than the first number of distinct activations and greater than the second number of distinct activations.

Embodiment 8 is the method of embodiment 7, wherein: the first number of distinct activations is four activations; the intermediate number of distinct activations is three activations; and the second number of distinct activations is two activations.

Embodiment 9 is the method of any one of embodiments 1 through 8, wherein: the display device presents a first line of the intermediate frame of image content by activating a first line of the array of pixels for a first amount of time; and the display device presents a second line of the intermediate frame of image content by activating a second line of the array of pixels for a second amount of time that is different from the first amount of time.

Embodiment 10 is the method of any one of embodiments 1-9, comprising: receiving an indication that the display device is to transition from the second refresh rate back to the first refresh rate; programming, responsive to receiving the indication that the display device is to transition from the second refresh rate back to the first refresh rate, an additional intermediate frame of image content to the array of pixels, including by scanning the additional intermediate frame of image content line-by-line to the array of pixels at the intermediate scan rate; activating the array of pixels to present the additional intermediate frame of image content that was scanned to the array of pixels at the intermediate scan rate; programming an additional first frame of image content to the array of pixels, while the display device is operating at the first refresh rate, including by scanning the additional first frame of image content line-by-line to the array of pixels at the first scan rate; and activating the array of pixels to present the additional first frame of image content that was scanned to the array of pixels at the first scan rate.

Embodiment 11 is the method of any one of embodiments 1-10, wherein: programming the intermediate frame of image content to the array of pixels is performed while the display device is operating at an intermediate refresh rate that is between the first refresh rate and the second refresh rate.

Embodiment 12 is the method of any one of embodiments 1-11, wherein: prior to receiving the indication that the display device is to transition from the first refresh rate to the second refresh rate, the display device programmed and presented a first series of at least one-hundred frames of image content at the first refresh rate, including the programming and presenting of the first frame of image content; and after presenting the intermediate frame of image content, the display device presented a second series of at least one-hundred frames of image content at the second refresh rate, including the programming and presenting of the second frame of image content.

Embodiment 13 is the method of embodiment 12, wherein: the programming of the first series of at least one-hundred frames of image content included scanning each frame of image content of the first series of at least one-hundred frames of image content line-by-line to the array of pixels at the first scan rate; and the programming of the second series of at least one-hundred frames of image content included scanning each frame of image content of the second series of at least one-hundred frames of image content line-by-line to the array of pixels at the second scan rate.

Embodiment 14 is the method of any one of embodiments 12-13, wherein: the programming of the intermediate frame of image content is an only frame of image content scanned to the array of pixels at the intermediate scan rate, between the display device presenting the first frame of image content and the display device presenting the second frame of image content.

Embodiment 15 is the method of any one of embodiments 1-14, comprising, after the display device presents the first frame of image content and before the display device presents the second frame of image content: programming a second intermediate frame of image content to the array of pixels, including by scanning the second intermediate frame of image content line-by-line to the array of pixels at a second intermediate scan rate that is between the first scan rate and the second scan rate; activating the array of pixels to present the second intermediate frame of image content that was scanned to the array of pixels at the second intermediate scan rate; programming a third intermediate frame of image content to the array of pixels, including by scanning the third intermediate frame of image content line-by-line to the array of pixels at a third intermediate scan rate that is between the first scan rate and the second scan rate; and activating the array of pixels to present the third intermediate frame of image content that was scanned to the array of pixels at the third intermediate scan rate.

Embodiment 16 is the method of embodiment 15, wherein: the intermediate scan rate, the second intermediate scan rate, and the third intermediate scan rate represent a sequence of different scan frequencies between the first scan rate and the second scan rate.

Embodiment 17 is the method of embodiment 16, wherein: a difference between the intermediate scan rate and the second intermediate scan rate is same as a difference between the second intermediate scan rate and the third intermediate scan rate.

Embodiment 18 is the method of any one of embodiments 16-17, wherein: programming the intermediate frame of image content to the array of pixels is performed while the display device is operating at a first intermediate refresh rate that is between the first refresh rate and the second refresh rate; programming the second intermediate frame of image content to the array of pixels is performed while the display device is operating at a second intermediate refresh rate that is between the first refresh rate and the second refresh rate; and programming the third intermediate frame of image content to the array of pixels is performed while the display device is operating at a third intermediate refresh rate that is between the first refresh rate and the second refresh rate.

Embodiment 19 is the method of any one of embodiments 1-18, comprising: applying a first gamma to the first frame of image content, the first gamma being a gamma designated for the first refresh rate; applying an intermediate gamma to the intermediate frame of image content; and applying a second gamma to the second frame of image content, the second gamma being a gamma designated for the second refresh rate.

Embodiment 20 is a display system, comprising: a display device that includes an array of pixels; and circuitry that is configured to: program a first frame of image content to the array of pixels, while the display device is operating at a first refresh rate in which image content presented by the array of pixels is refreshed at the first refresh rate, including by scanning the first frame of image content line-by-line to the array of pixels at a first scan rate; activate the array of pixels to present the first frame of image content that was scanned to the array of pixels at the first scan rate; receive an indication that the display device is to transition from the first refresh rate to a second refresh rate in which image content presented by the array of pixels is refreshed at the second refresh rate; program, responsive to receiving the indication that the display device is to transition from the first refresh rate to the second refresh rate, an intermediate frame of image content to the array of pixels, including by scanning the intermediate frame of image content line-by-line to the array of pixels at an intermediate scan rate that is between the first scan rate and a second scan rate; activate the array of pixels to present the intermediate frame of image content that was scanned to the array of pixels at the intermediate scan rate; program a second frame of image content to the array of pixels, after the display device has presented the intermediate frame of image content and while the display device is operating at the second refresh rate, including by scanning the second frame of image content line-by-line to the array of pixels at the second scan rate; and activate the array of pixels to present the second frame of image content that was scanned to the array of pixels at the second scan rate.

Embodiment 21 is the display system of embodiment 20, wherein the circuitry is configured to perform the method of any one of embodiments 1-19.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes technology for scanning image data to an array of pixels at an intermediate scan rate, during a transition between different refresh rates. A computing device may scan image data to the array of pixels at different scan rates for different display refresh rates. To minimize or eliminate user-perceptible screen flicker during a transition from a first refresh rate and a first scan rate to a second refresh rate and a second scan rate, the computing device may present multiple frames of image data during a transition period. A scan rate of the frames presented during the transition period may progressively change from the first scan rate to the second scan rate. The following discussion explains operation of an example display device and how the display device can implement an intermediate scan rate during a transition between refresh rates.

Figure 1:
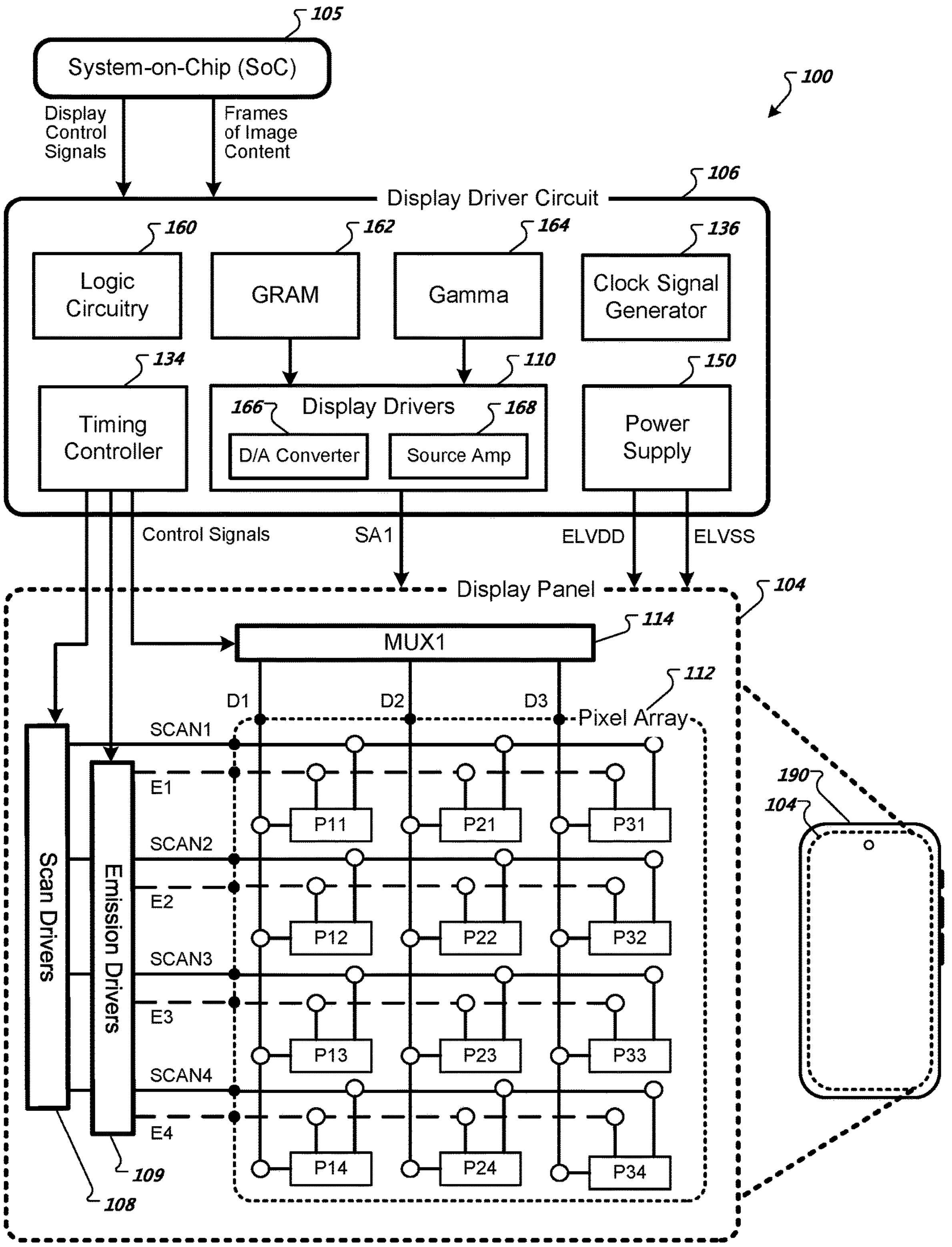
FIG. 1 shows a diagram of an example display system of an electronic device.

FIG. 1 shows a diagram of an example display system 100 of computing device 190. The display system 100 may be an LED display system that includes an array of pixels 112 that emit light. Each light emitting pixel includes a LED (e.g., an OLED). The array of pixels 112 may be located on a display panel 104 that includes various supporting circuitry, including SCAN drivers 108 and emission drivers 109.

The array of pixels 112 is driven by multiple drivers, including the scan drivers 108, the emission drivers 109, and data drivers 110. The scan drivers 108 and the emission drivers 109 can be integrated (e.g., stacked) row line drivers.

The data drivers 110 provide data signals (e.g., voltage data (VDATA)) for receipt by the data lines (e.g., D1-D3), at which the data signals may be stored by a capacitance of each respective data line. The scan drivers 108 provide a SCAN signal to a selected one of the scan lines (e.g., SCAN1) to move the data signals stored at the data lines to pixels in the selected scan line, programming the pixels in the selected scan line with image data that is specified by the data signals. The emission drivers 109 provide an EM signal to a selected one of the emission lines (e.g., E1) to activate the LEDs in the selected row to emit light at intensities specified by the data signals.

Although FIG. 1 illustrates the display system 100 having the scan drivers 108 and the emission drivers 109 on a single side of the display, the scan drivers 108 and the emission drivers 109 can be located on different sides of the display (e.g., left and right sides) to improve driving performance.

The pixel array 112 includes a plurality of light emitting pixels, for example, pixels P11 through P34. A pixel is a small element of a display that includes an LED that can emit light at different intensities based on the image data supplied to the pixel. A color of light emitted by each pixel may be defined by a type of an LED that each pixel includes, and/or a color of a filter placed over each such LED.

Each pixel includes an LED and circuitry to receive an image data value provided by a data signal, store the received image data value, and drive the LED at an intensity based on the data value. The pixel circuitry may have the configuration shown in FIG. 2A, although other pixel circuitry configurations may be used. Each pixel within the pixel array 112 can be addressed individually to produce various intensities of a color produced by the pixel.

Each pixel maintains a mostly-steady luminance throughout a frame time, displaying light at an intensity corresponding to the supplied image data. A frame time, or frame period, is an amount of time between a start of a frame and a start of a next frame. The frame time can be the inverse of a frame rate of the display system 100. For example, a frame rate of 60 frames per second (fps) corresponds to a frame time of one-sixtieth of a second, or 0.0167 seconds.

The pixel array 112 extends in a plane and includes rows of pixels that extend horizontally across the pixel array 112 and columns of pixels that extend vertically across the pixel array 112. For example, a first row of the pixel array 112 includes pixels P11, P21, and P31, while a second row of the pixel array 112 includes pixels P12, P22, and P32. A first column of the pixel array 112 includes pixels P11, P12, P13, and P14, while a second column of the pixel array includes pixels P21, P22, P23, and P24.

Only a few pixels are shown in FIG. 1 for simplicity. In practice, there may be thousands or millions of pixels in the pixel array 112. Increasing the number of pixels in a pixel array that remains the same size results in higher image resolution (e.g., a greater density of pixels).

The display system 100 includes a display driver circuit 106 that provides signals with suitable voltage, current, and timing to cause the array of pixels 112 to show images according to frames of image content received by the display driver circuit 106. The display driver circuit 106 may be separate from the display panel 104 (as shown in FIG. 1), or may be part of the display panel 104.

The display driver circuit 106 may receive display control signals and frames of image content from a separate circuit, such as a system-on-chip (SoC) 105. The SoC 105 may be a main processor of the computing device 190, and may be the processor on which application programs execute. The display driver circuit 106 can be, for example, a semiconductor integrated circuit or a state machine. The display driver circuit 106 can be a microcontroller and may incorporate RAM, Flash memory, EEPROM, ROM, etc. The scan drivers 108, the emission drivers 109, and/or the data drivers 110 can be integrated with the display driver circuit 106 or be separate from the display driver circuit 106. The display driver circuit 106 may be called a "DDIC" when implemented as an integrated circuit.

The display driver circuit 106 includes logic circuitry 160 that can receive display control signals from the SoC 105, and that can control operation of the display driver circuit 106. The display driver circuit 106 can store one or more frames of image content received from the SoC 105 in the GRAM 162. For example, the GRAM 162 can serve as a frame buffer that stores a single frame of image content.

The display drivers 110 may include a digital-to-analog (D/A) converter 164, which can convert image data received from the GRAM 162 from digital to analog form (e.g., to discrete analog voltage levels). The conversion process involve converting a single row of image data from a stored frame, and may use reference voltages received from the gamma block 164. In some examples, the gamma block 324 generates eight different reference voltage levels. The eight reference voltages represent intermediate levels between grayscale values of zero and two hundred fifty-five.

The display drivers 110 can include a source amplifier 168 that amplifies the signals output from the D/A converter 166, for transmission of such signals to the display panel 104 (e.g., to multiplexers 113 of the display panel 104). As such, the signals that the data drivers 110 supply to columns of the pixel array 112 are based on a frame of image content that the display driver circuit 106 receives from the SoC 105 and stores in the GRAM 162.

The data drivers 110 output data values via source amp output signal lines SAN (e.g., a set of source amp signal lines SA1, SA2, and SA3) to a set of multiplexers 114 (e.g., MUX1, MUX2, and MUX3). Each multiplexer in the set receives data values from a corresponding source amp output signal line, and routes the received data values among a greater number of data lines. For example, FIG. 1 illustrates a single multiplexer 114 that is configured to receive a stream of data values from the data driver 110 via the source output signal line SA1, and distribute the stream of data values one at a time among the data signal lines D1-3. In practice there may be multiple multiplexers, each being fed with data values provided by a corresponding source control signal line.

The timing controller 134 generates control signals, for example, signals that control a display frame start time and a display frame stop time of each frame presented by the display panel 104, where a frame represents a single image in a sequence of images that are presented by the display panel 104. In examples in which each frame presented by the display panel is presented with multiple emission cycles, the control signals generated by the timing controller 134 can control a display emission start time and a display emission stop time of each emission cycle. The control signals generated by the timing controller 134 can drive the scan drivers 108, the emission drivers 109, the display drivers 110, and the multiplexers 114. Thus, the display driver circuit 106 controls the timing of the SCAN signals, EM signals, and data signals.

A clock signal generator 136 may generate a clock signal that defines a rate at which various components of the display system 100 operate. For example, the timing controller 134 may receive the clock signal and provide a VSync signal to various drivers at a time period that is based on a multiple of the clock signal. The scan drivers 108 and the emission drivers 109 transition from row to row at a rate defined by the clock signal (e.g., switching from row to row with each cycle of the clock signal). A refresh rate of the display system 100 may be a multiple of the clock signal.

The scan drivers 108 and the emission drivers 109 supply SCAN and EM signals to rows of the pixel array 112. For example, the SCAN drivers 108 supply scan signals via scan lines S1 to S4 to the rows of pixels, and the emission drivers 109 supply EM signals via EM lines E1 to E4 to the rows of pixels. Each row of pixels in the pixel array 112 is addressed by a scan line and a corresponding emission line. For example, the first row of the pixel array 112 is addressed by scan line SCAN1 and emission line E1.

Each pixel in the pixel array 112 is addressable by a horizontal scan line, a horizontal EM line, and a vertical data line. For example, the pixel P11 is addressable by the data line D1, the scan line S1, and the EM line E1. The pixel P23 is addressable by the data line D2, the scan line S3, and the EM line E3.

The scan lines are addressed sequentially for each frame. A scan direction determines an order in which the scan lines are addressed (e.g., a direction in which rows of pixels receive data values and then light up at intensities based on the received data values). In display system 100, the scan direction is from a top of the pixel array 112 to a bottom of the pixel array 112. For example, the scan line S1 is addressed first, followed by the scan line S2, then S3, etc. In some implementations, all rows of pixels are programmed with data values using SCAN signals (one row at a time), before the display device activates all rows of pixels at intensities based on the programmed data values. In some implementations, a display device may activate rows of pixels while other rows of pixels are still being programmed, such that there is a gap of one or more rows between a row currently receiving a SCAN signal and a row of pixels that has been activated and is beginning to emitting light.

The display system 100 also includes a power supply 150. The power supply 150 provides a first supply voltage ELVDD and a second supply voltage ELVSS, both of which are provided to each pixel in the pixel array 112. In some examples, the power supply 150 can be integrated with the display driver circuit 106.

The power supply 150 or the display driver circuit 106 may include a DC-to-DC converter (not shown in FIG. 1). The DC-to-DC converter can boost a lower input voltage to a stable higher output voltage. For example, an input voltage to the DC-to-DC converter can be three volts and an output voltage can be six volts. The control signals provided to the display panel 104 by the timing controller 134 (e.g., the scan signals, emission signals, and multiplexer signals) may be at the higher voltages generated by the DC-to-DC converter. The logic circuitry 160 and other components of the display driver circuit 106 may operate at the lower voltage.

In some examples, each of the data lines D1 to D3 represent multiple data lines. For example, the pixel P11 can include three subpixels (e.g., P11R for a red subpixel, P11G for a green subpixel, and P11B for a blue subpixel), and the data line D1 can represent three corresponding data lines, each addressing a corresponding subpixel of pixel P11. In some examples, each of the data lines D1 to D3 represents a data line for a differently-colored subpixel (e.g., P11 represents a red subpixel, P21 represents a green subpixel, and P31 represents a blue subpixel).

While FIG. 1 illustrates that each row is addressed by a single scan line, each row may be addressed by multiple scan lines (e.g., nSCAN and pSCAN). Although FIG. 1 illustrates example components of an LED display, the described techniques may be applied to other flat panel display technologies that include an array of pixels. For example, the technology may be applied to liquid crystal displays (LCD) and plasma display panels (PDP).

Figure 2A:
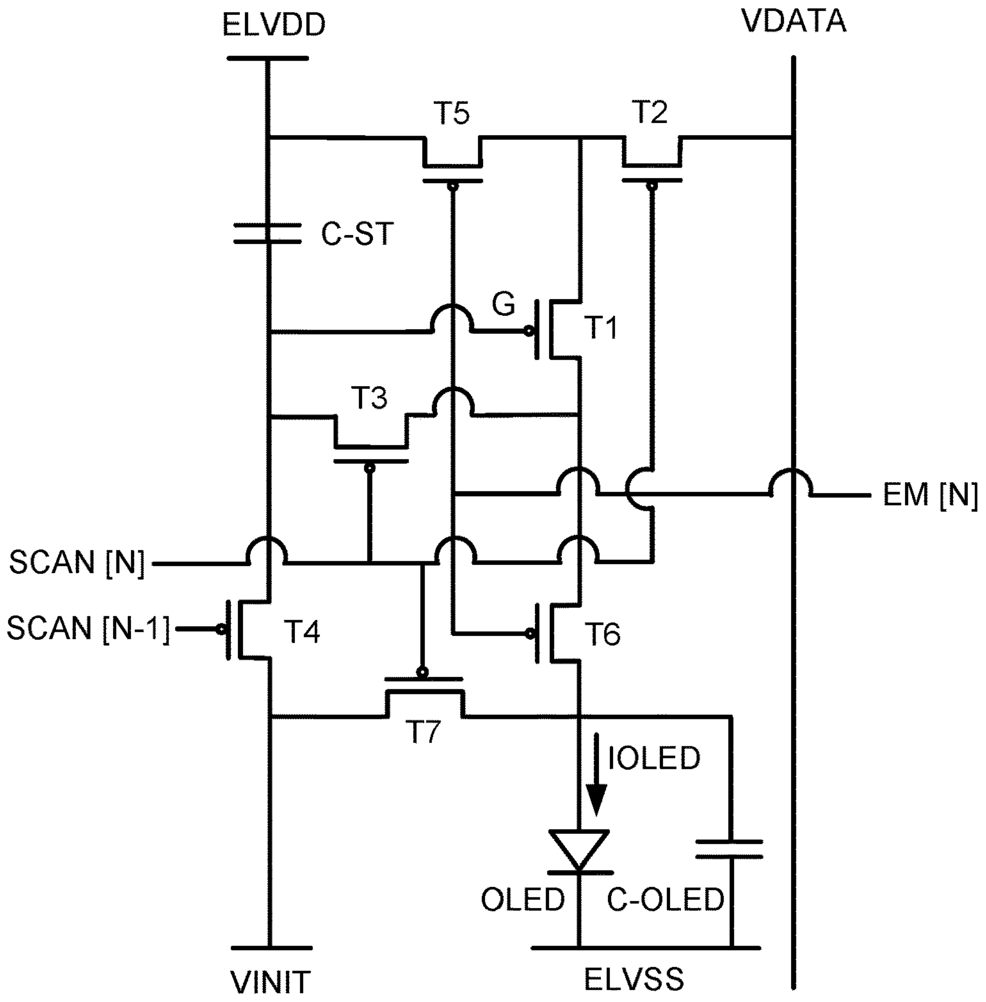
FIGS. 2A-B show a diagram of a pixel circuit of a display device and a corresponding timing diagram.

FIG. 2A shows a diagram of a pixel circuit of a display device, which pixel circuit includes an LED and corresponding drive circuitry for the pixel circuit. FIG. 2A may illustrate a more detailed view of a single pixel from the array of pixels shown in FIG. 1. While this disclosure sometimes refers to the components shown in FIG. 2A as a "pixel circuit", this disclosure may also refer to such components as simply a "pixel." Further, the pixel shown in FIG. 2A can represent a sub-pixel.

The pixel circuit may be an active matrix OLED (AMOLED) pixel circuit. The pixel circuit receives an EM signal on an emission signal line, SCAN signals on scan signal lines, and a data voltage (VDATA) signal on a data signal line. The pixel circuit 200 receives a first supply voltage ELVDD on a first voltage supply line, a second supply voltage ELVSS on a second voltage supply line, and an initial reference voltage VINIT on an initial voltage supply line.

The pixel circuit includes an organic light-emitting diode (OLED). The OLED includes a layer of an organic compound that emits light in response to an electric current, IOLED. The organic layer is positioned between two electrodes: an anode and a cathode. The OLED is driven by a driving transistor T1, which receives the supply voltage ELVDD and acts as a current source that drives the OLED to emit light.

The pixel also includes a storage capacitor CST and transistors T2 through T7. The operation of the pixel is defined by states of the control signals SCAN, EM, and VDATA. An amount/level of the OLED current (IOLED) is set by a voltage present at a gate terminal of the driving transistor T1, referred to herein as the "G" node.

The driving transistor T1 has a threshold voltage VTH between the gate terminal of the driving transistor T1 and a source terminal of the driving transistor T1. If the voltage between the gate terminal and the source terminal is above the threshold voltage VTH, the driving transistor T1 creates a conducting path from the source terminal to the drain terminal. An amount of current IOLED that flows through the conducting path through the driving transistor T1 corresponds to an amount that the voltage between the gate terminal and the source terminal is above the threshold voltage VTH.

Figure 2B:
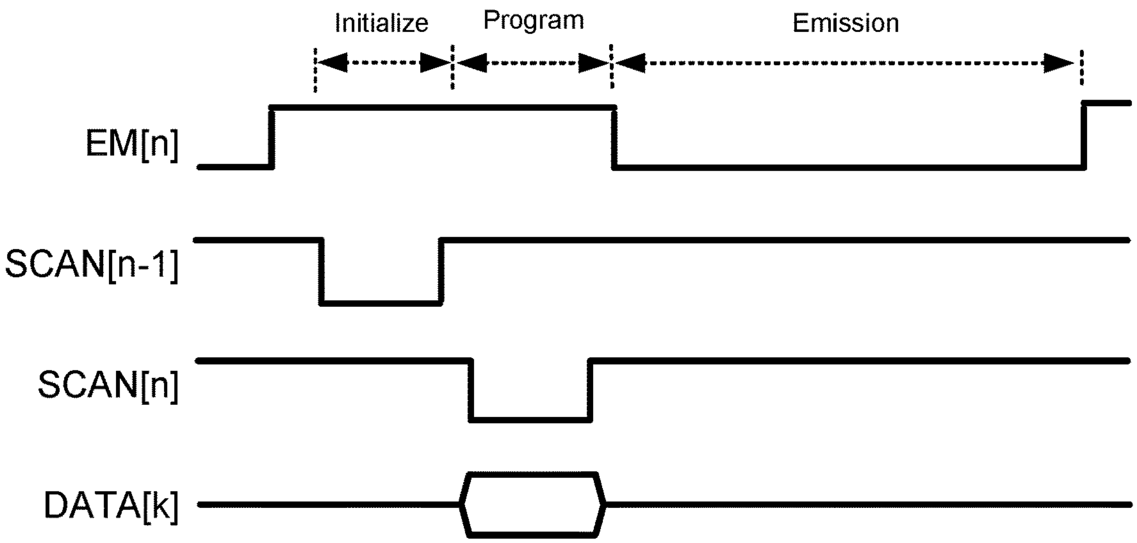

FIG. 2B shows a timing diagram of the control signals provided to and received by the pixel shown in FIG. 2A. These control signals repeatedly transition during operation of the display system 100 between an initialization stage, a programming stage, and an emission stage.

At an end of an emission stage, the EM signal transitions to an off state (e.g., by changing from a low state to a high state). This transition turns off transistors T5 and T6, which interrupts current being provided from ELVDD to the OLED, therefore stopping light emission by the OLED. Since the EM signal may be provided to an entire line of pixels, this transition can turn off all pixels in the line of pixels.

During the initialization stage, the SCAN[n−1] signal turns to an on state (e.g., by changing form a high state to a low state), which turns on transistor T4 for a period of time and initializes the G node to the initialization voltage VINIT. Since the SCAN[n−1] signal may be provided to an entire line of pixels, this initialization stage can erase the data values that were previously stored at each pixel in the line of pixels. The SCAN[n−1] signal may be the SCAN[n] signal provided to a preceding row by a state machine of the scan drivers 108.

During the programming stage, the SCAN[n] signal turns to an on state (e.g., by going low), which turns on transistors T2, T3, and T7 for a period of time. This causes the VDATA value at the data line to pass through transistors T2, T1, and T3 to the G node, setting the G node to a value based on the VDATA line (e.g., the voltage at VDATA minus an effect of transistor threshold voltages). Since the SCAN signal may be provided to an entire line of pixels, this programming stage can cause each pixel in the line of pixels to move data voltage values from each pixel's respective data line to the G node of each respective pixel.

During the emission stage, the EM signal turns to an on state (e.g., by going low), which turns on transistors T5 and T6. Current flows from ELVDD through transistors T5, T1, and T6 to an anode of the OLED. Since the EM signal is provided to an entire line of pixels, all pixels in the line of pixels may activate.

A current level provided to the OLED in each pixel is determined by the voltage present at the G node of the pixel (e.g., with the G node voltage level having been programmed to the data line). An intensity or brightness of light emitted by the OLED directly correlates to an amount of electrical current IOLED applied to the OLED, with higher current corresponding to a greater intensity of light than a lower current. The storage capacitor CST maintains the voltage at the G node, so that the OLED continues to emit light at roughly the same level for a duration of the emission stage. The voltage at the G node may decrease slightly during the emission stage. As such, the current IOLED applied to the OLED and the intensity of light emitted by the OLED may decrease slightly during the emission stage.

Figure 3A:
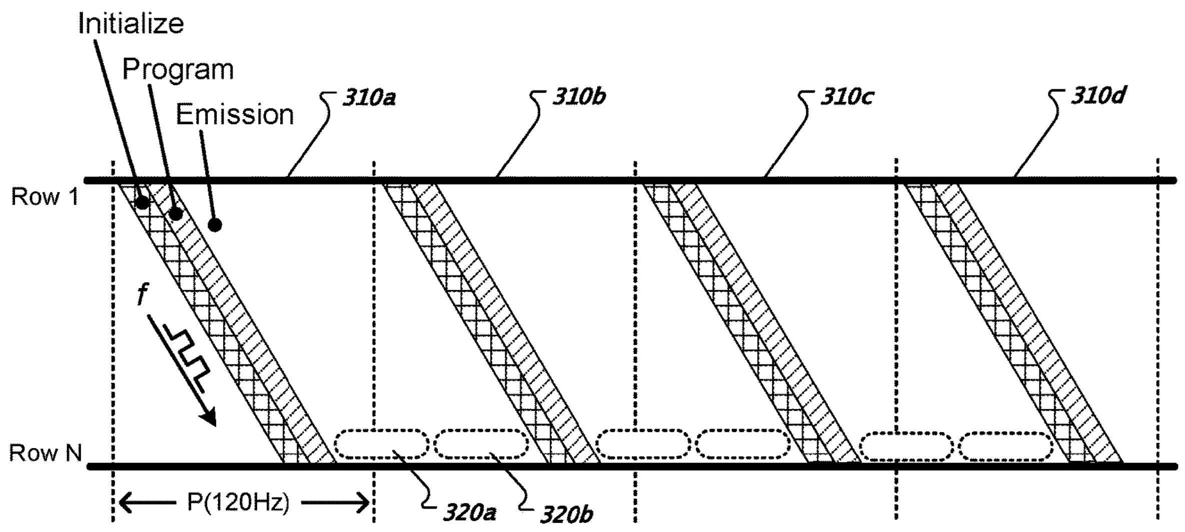
FIGS. 3A-B show diagrams that illustrate frames being presented at two different refresh rates.

FIG. 3A shows a diagram that illustrates a sequence of frames presented at a 120 Hz refresh rate. In particular, the diagram shows four frames 310*a-b*, with frame times being separated from each other by vertical dotted lines. The vertical dotted lines represent a beginning of each frame time (e.g., instances of a VSync signal), with an amount of time between successive lines being defined by a current refresh rate of the display device. The FIG. 3A diagram shows display operation at a 120 Hz refresh rate, as illustrated by the notation "P(120 Hz)" along the horizontal time axis, indicating that each frame has a single "Period of time at 120 Hz", which is 0.00833 seconds.

The vertical dimension of the FIG. 3A diagram represents rows of an array of pixels, from "Row 1" (e.g., a top row of the array of pixels) to a last "Row N" (e.g., a bottom row of the array of pixels).

The shaded region labelled "Initialize" represents a period of time at which pixels in each row are initialized, for example, as a result of a signal being activated on the SCAN[n−1] line for a given row of pixels. Each row of pixels may be initialized separately, such that only a single row of pixels receives an active signal on its SCAN[n−1] line at a time.

The row of pixels at which the SCAN[n−1] line is activated may switch every cycle of a clock signal, to a next row of pixels, such that the beginning of each frame differs for each row of pixels. Accordingly, the figures use vertical lines to illustrate the beginning/end of a frame from the perspective of the first row. The progression of activating SCAN[n−1] lines, one after another, down an array of pixels is illustrated by the angled nature of the "Initialize" region. Scan driver 108 (FIG. 1) is a component of the display device that activates the SCAN[n−1] lines, one at a time.

A rate at which the scan driver 108 cycles from line to line is defined by a clock signal, for example, a clock signal produced by the clock signal generator 136 (FIG. 1). The clock signal may be received by the scan drivers 108 and/or the timing controller 134, to cause the scan drivers 108 to scan the array of pixels 112 at a particular scan rate (e.g., a scan rate that directly corresponds to a frequency of the clock signal or that is a multiple thereof). The FIG. 3A diagram illustrates a scan rate of "f" (for "frequency"), accompanied by an angled arrow and a square wave atop the arrow.

The shaded region labelled "Program" represents a period of time at which the pixels in each row are programmed with image data, for example, as a result of a signal being activated on the SCAN line for a given row of pixels. Each row of pixels may be programmed separately, such that only a single row of pixels receives an active signal on its SCAN line at a time.

The row of pixels at which the SCAN line is activated may switch every cycle of a clock signal, like with the "Initialize" operations. The SCAN line activations also scan from line to line at the scan rate of "f". As illustrated in FIG. 2B, the "Program" time period for each line of pixels (resulting from activating the SCAN[n] line) may immediately follow the "Initialize" time period for the same line of pixels (resulting from activating the SCAN[n−1] line). A line of pixels may not emit light while that line of pixels is in the "Initialize" and "Program" time periods (see FIG. 2B).

The unshaded-region labelled "Emission" represents the time period at which the emission line for a row of pixels is activated, to cause pixels in that row to emit light at intensities specified by the image data values programmed to the pixels in the row.

In some implementations, an "Emission" time period includes multiple distinct activations of each pixel in a row of pixels, for example, pixel activations 320*a* and 320*b*. The distinct pixel activations may result from a line of pixels performing a "self-refresh," or otherwise de-activing LED emission momentarily. During such a refresh, each pixel may retain its programmed image data value, so that the LED emits light at a same intensity after re-activation. Each line of pixels may begin and end its respective activation period individually, one line after another. As such, the activation periods 320*a* and 320*b* represent the activation periods for a single row of the array of pixels. The activation periods for an adjacent row of pixels may be offset in time by a single clock cycle (or a multiple thereof).

Separating an emission period into multiple distinct pixel activations allows a display to dim in a manner that can avoid perceptible flicker. For example, using pulse-width modulation techniques to provide multiple, shorter "off" periods instead of providing a single, longer "off" period (e.g., at an end of the emission period between the "Emission" period and the "Initialize" time period, or by extending the "Initialize" time period). A single, longer "off" period may generate a user-perceptible flicker, while splitting the same amount of "off" time into multiple distinct "off" periods may not be user perceptible.

Figure 3B:
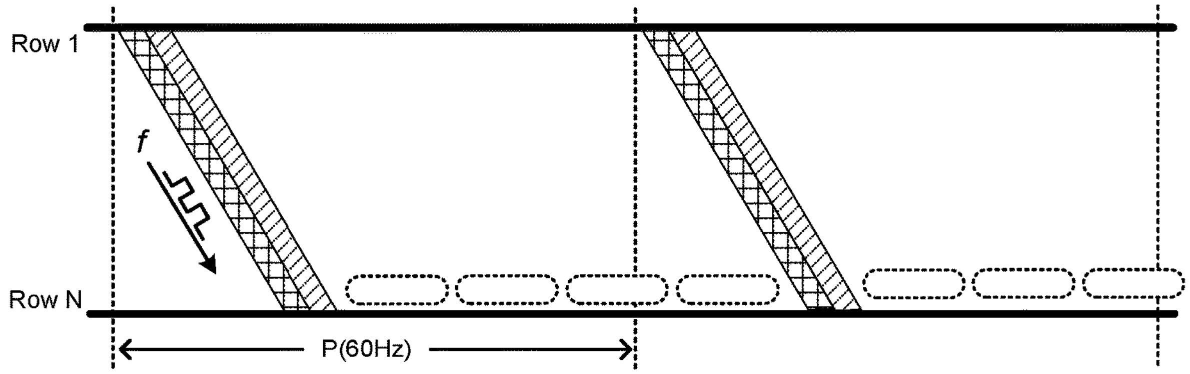

FIG. 3B shows a diagram that illustrates a sequence of frames presented at a 120 Hz refresh rate. The display device operations represented by FIG. 3B are similar to those of FIG. 3A, with a primary difference being that the refresh rate in FIG. 3B is 60 Hz rather than the 120 Hz refresh rate illustrated in FIG. 3A, such that each frame is twice as long. Also, there are twice as many distinct pixel activations each emission period (four instead of two). A length of each distinct pixel activation may be same for both 120 Hz and 60 Hz in the operational states illustrated in FIGS. 3A-B. The scan rate of the "Initialize" and "Emission" time periods in FIG. 3B is same as that of FIG. 3A (both "f"). A display device may switch between the operational modes illustrated in FIGS. 3A-B, switching between 60 Hz and 120 Hz refresh rates as the nature of image content varies, but maintaining a same scan rate.

Figure 4A:
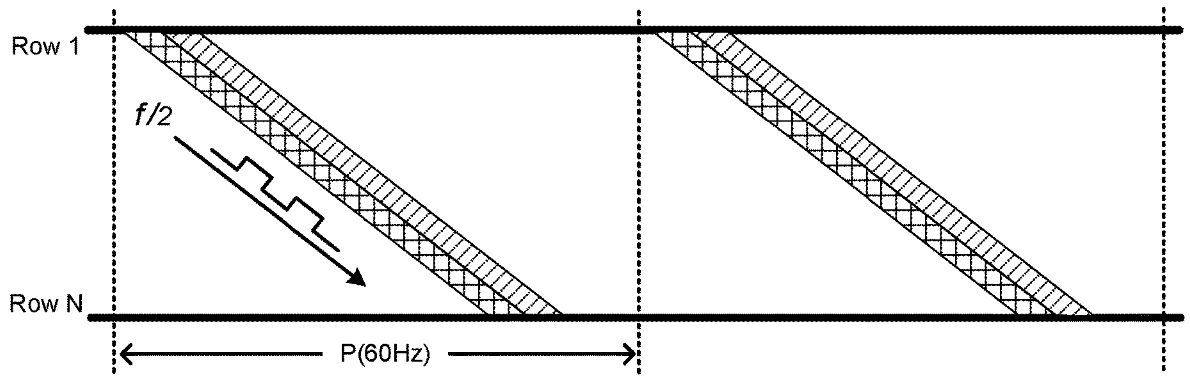
FIG. 4A shows a diagram that illustrates frames being presented at a reduced scan rate.

FIG. 4A shows a diagram that illustrates a sequence of frames presented at a 60 Hz refresh rate. The display operations illustrated in FIG. 3B are similar to those of FIG. 3B, except that the scan rate in FIG. 4A is "f/2", which is half the frequency of the scan rate of "f" illustrated in FIG. 3B. As a result, a display device operating as illustrated in FIG. 3B takes longer to initialize and program an entire frame of image content to the array of pixels than with the operations of FIG. 3B. Stated another way, it may take twice as long to scan each frame.

Operating at a reduced scan rate can reduce a level of energy consumed by the display device. For example, a reduced scan rate can be implemented by reducing a frequency generated by the clock signal generator 136 (FIG. 1), which can slow the operation of multiple components that receive the clock signal, such as timing controller 134, scan drivers 108, emission drivers 109, and display drivers 110.

A difficulty with implementing a relatively-low scan rate at a lower refresh rate (e.g., 60 Hz) is that an amount of time that it takes the display device to scan an entire array of pixels may be greater than an amount of time it takes to scan the entire array of pixels at a higher refresh rate (e.g., 120 Hz). As such, a frame time at a highest refresh rate implemented by a display device is a constraint on how much the scan rate can be reduced, should the scan rate remain the same among all different refresh rates.

Figure 4B:
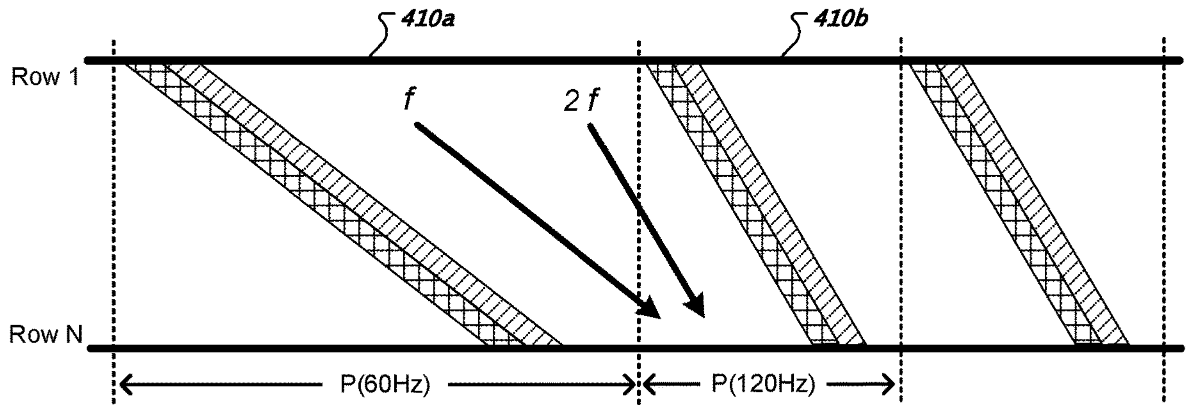
FIGS. 4B-C show diagrams that illustrate effects of a transition from one scan rate to another scan rate.

FIG. 4B shows a diagram that illustrates a display device transitioning from a low scan rate to a higher scan rate as the display device transition from a low refresh rate to a higher refresh rate. A first frame 410*a* is implemented with a first refresh rate of 60 Hz and a first scan rate of "f". A second frame 410*b* is implemented with a second refresh rate of 120 Hz and a second scan rate of "2f".

In some implementations, a change in scan rate may result in an undesirable user-perceptible flicker, for example, due to the change in frequency being greater than a threshold change in frequency. The user-perceptible flicker may result from rows of the array of pixels emitting light for different amounts of time during the transition. The differing amounts of time is illustrated by the converging arrows in FIG. 4B. For example, an amount of time that pixels in Row 1 are active and emit light is greater than the amount of time that pixels in Row N are active and emit light.

Figure 4C:
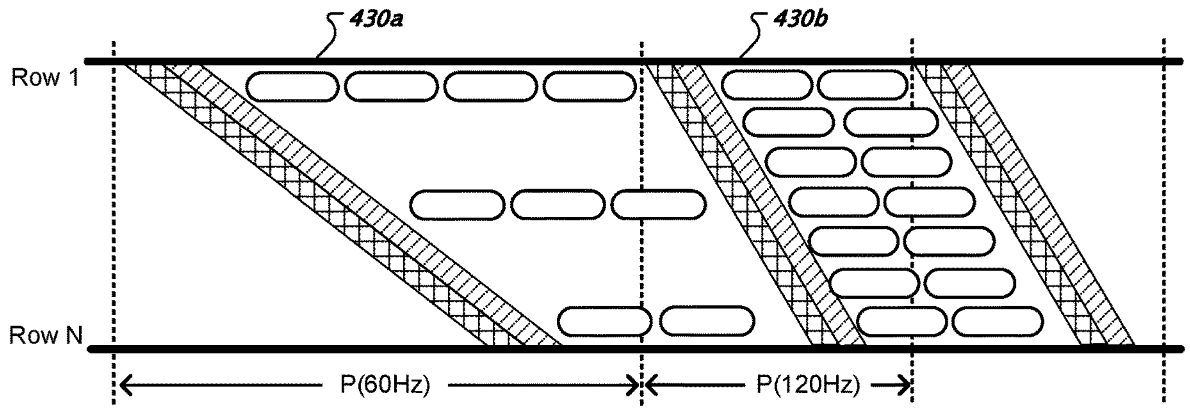

FIG. 4C shows a diagram that illustrates a transition between scan rates, and its effect on implementing multiple distinct pixel activations per emission period. For example, FIG. 4C illustrates how the convergence of the scans of frames 430*a* and 430*b* interferes with implementing a same number of distinct pixel activations for every row of pixels. For example, Row 1 is activated long enough to implement four distinct pixel activations, while Row N is only activated long enough to implement two distinct pixel activations. A row in the middle is only activated long enough to implement thee distinct pixel activations. With the operational mode illustrated in FIG. 4C, in order to minimize user-perceptible flicker, different lines of pixels may implement different numbers of distinct pixel activations and those pixel activations may have different lengths from line to line.

Figures 5A, 5B:
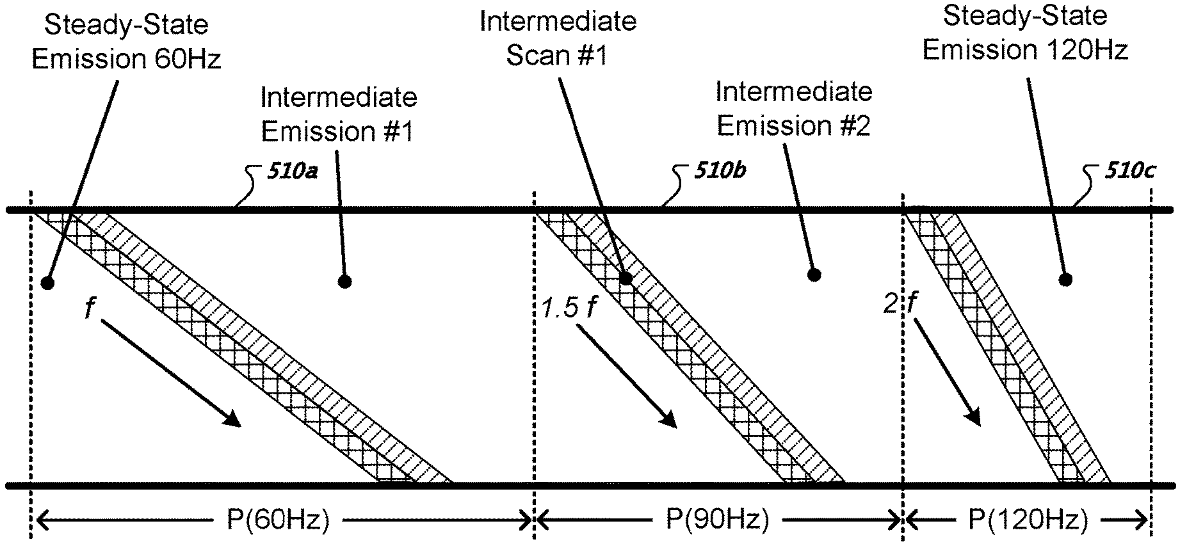
FIG. 5A shows a diagram that illustrates a transition between refresh rates that includes presentation of an intermediate frame.
FIG. 5B shows a table of example characteristics of a sequence of frames.

FIG. 5A shows a diagram that illustrates a transition between refresh rates in which the transition is includes an intermediate frame. For example, FIG. 5A shows: (1) a first frame 510*a* that operates at a first refresh rate and first scan rate (e.g., 60 Hz and "f"); (2) a second frame 510*c* that operates at a second refresh rate and second scan rate (e.g., 120 Hz and "2f"); and (3) an intermediate frame 510*b* that operates at an intermediate refresh rate and an intermediate scan rate (e.g., 90 Hz and "1.5 f").

The "Emission" time periods in FIG. 5A are each labelled. The time period labelled "Steady-State Emission 60 Hz" represents a last emission time period of a steady-state presentation of multiple frames operating at a 60 Hz refresh rate. Conversely, the time period labelled "Steady-State Emission 120 Hz" represents a first emission time period of a steady-state presentation of multiple frames operating at a 120 Hz refresh rate.

The transition illustrated in FIG. 5A includes a single "Intermediate Scan #1" that represents a single set of "Initialize" and "Emission" scans operating at an intermediate scan rate of "1.5 f", which is between the scan rates of "f" and "2f". FIG. 5A also illustrates that the refresh rate of the intermediate frame is an intermediate rate of 90 Hz, which is between the refresh rates of 60 Hz and 120 Hz. In some implementations, the intermediate frame has a refresh rate that is a greater of the two primary refresh rates, such that frame 510*b* would have a 60 Hz refresh rate. FIG. 7C (discussed more later) illustrates display device operation in which there is at least one intermediate frame but there is no intermediate refresh rate.

A benefit of transitioning between scan rates with an intermediate scan rate (as shown in FIG. 5A) is that a size of change in scan rate between two adjacent frames can be relatively small, such that the change in scan rate may not be user perceptible. For example, the convergence between the arrows shown in FIG. 5A is not as significant as the convergence illustrated in FIG. 4B.

While FIG. 5A showed a transition from one refresh rate to another with a single intermediate scan, a display device may implement multiple such intermediate scans that sequentially change from a first scan rate to a second scan rate. A number of intermediate frames may depend on an amount of difference between the first and second scan rates, and an amount that the scan rate may be changed each frame without being user perceptible.

FIG. 5B shows a table of example characteristics of a sequence of frames presented by a display device. A top row of the table identifies eleven different frames with unique frame numbers, with a second row identifying a type of each frame. Frame #1 is listed as a Normal Speed (NS) type of frame that has a scan rate of "f" and a frame length of 1⁄60 seconds. Each of the hundreds of frames that preceded Frame #1 may have the same characteristics. Frame #11 is a High Speed (HS) type of frame that has a scan rate of "2f" and a frame length of 1⁄120 seconds. Each of hundreds of frames that follow Frame #11 may have the same characteristics.

Frames #2 through #10 are each an intermediate type of frame. Because each of these nine frames has different characteristics, they are identified separately as "I-1", "I-2", and so forth up to "I-9". As illustrated by the "Scan Rate" row, the scan rate progressively changes frame-by-frame, increasing by 0.1 "f" each frame. The change in scan rate may be implemented by modifying an oscillator frequency (e.g., a frequency produced by the clock signal generator 136 shown in FIG. 1). FIG. 5B shows that the change is linear (0.1 "f" each frame), but the change may be proportional (e.g., a percentage increase each frame). In some implementations the frame length progressively changes frame-by-frame, increasing 6 Hz each frame. As with the change in scan rate, the change in frame length may be proportional.

The "Gamma" row of the table indicates how each frame may use a distinct gamma (e.g., information that calibrates image content to physical and operational characteristics of a display device). In some examples, all intermediate frames use a single gamma (e.g., all use gamma "B"). In some examples, half the intermediate frames use the gamma of the NS frame type (e.g., frames 2-6 use gamma "A") and half the intermediate frames use the gamma of the HS frame type (e.g., frames 7-10 use gamma K). Other manners of transitioning from gamma "A" to gamma "B" may be used (e.g., two intermediate gammas, three intermediate gammas, etc.).

Figure 6A:
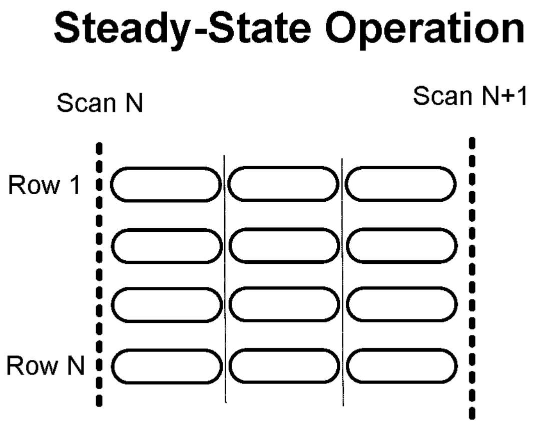
FIGS. 6A-C show diagrams that illustrate how a display device can implement multiple distinct pixel activations each frame.
Figure 6B:
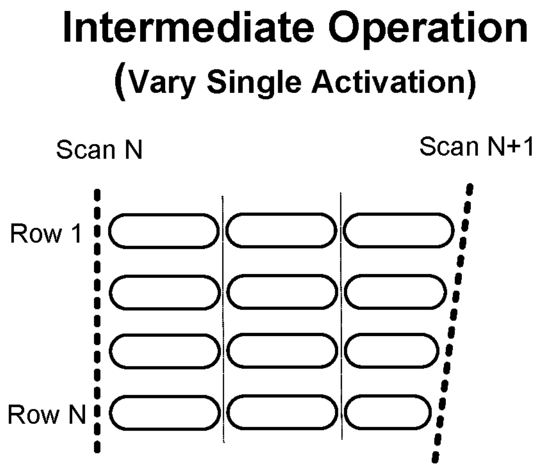
Figure 6C:
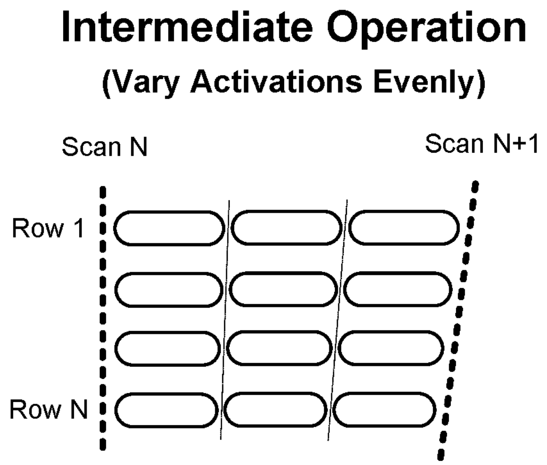

FIGS. 6A-C show diagrams that illustrate how a display device can implement multiple distinct pixel activations each frame, for different types of frames.

The FIG. 6A diagram illustrates a display device during steady-state operation (e.g., at a sustained 60 hz or 120 Hz refresh rate). The dotted vertical lines represent different scans of "Initialize" and "Program", such as two adjacent pairs of "Initialize" and "Program" scans in FIG. 3B. While FIG. 3B illustrates the scanning operation with angled regions, FIG. 6A represent the same with vertical dashed "scan" lines to illustrate how each row of pixels emits light for a same length of time each frame.

The FIG. 6B diagram illustrates a display device during intermediate operation, as illustrated by the converging Scan N and Scan N+1 lines. The convergence of these Scan lines corresponds to the convergence of the "f" and "1.5f" scan lines in FIG. 5A, resulting in Row 1 having a shorter overall emission period than Row 1 (although the difference may not be perceptible to a user). The difference in emission length is addressed by varying only the last activation performed by each row of pixels. A benefit of this approach is that any prior activations in the same frame can be performed at the same/continued scan rate (e.g., scanning the "Emission" lines with a momentary "off" signal during the emission period). A transition to a new clock rate can begin when the next frame begins (e.g., when the next VSync signal is sent out), with the timing of the next frame being defined by the refresh rate.

The FIG. 6C diagram illustrates a display device during intermediate operation, like with the FIG. 6B diagram except that all distinct activations in each row are varied evenly to fill the entire emission period. For example, the first row of pixel activations FIG. 6C and the last row of pixels activations in FIG. 6C both fill their entire respective emission period, and both have three emissions. Still, the length shared by each of the pixel activations in Row 1 is longer than the length shared by each of the pixel activations in Row N. The length of activations that is specific to each row (and specific to a selected refresh rate) may be identified from a pre-populated table or calculated during runtime by a best-fit algorithm.

Figure 7A:
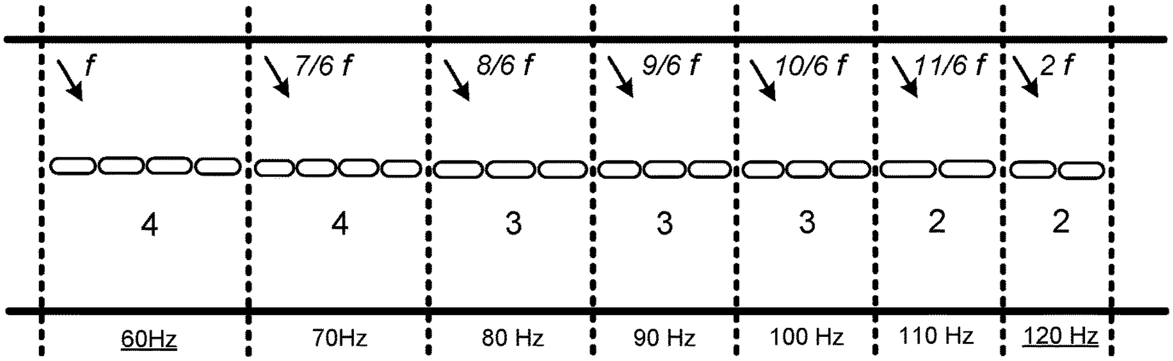
FIGS. 7A-C show diagrams of transitions between refresh rates and various manners to transition between different amounts of discrete pixel activations.
Figure 7B:
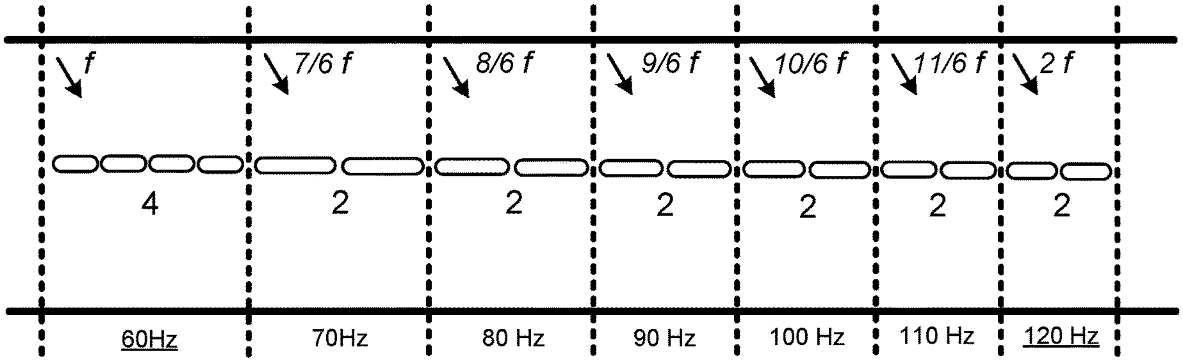
Figure 7C:
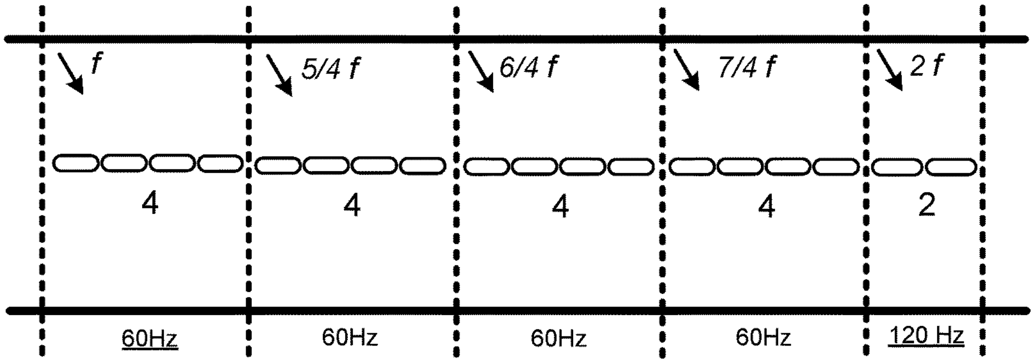

FIGS. 7A-C show diagrams of transitions between refresh rates and various manners to transition between different amounts of discrete pixel activations. For example, FIGS. 7A-C all show a transition from (1) display operation at a 60 Hz refresh rate, with a scan rate of "f" and four distinct activations, to (2) display operation at a 120 Hz refresh rate, with a scan rate of "2f" and two distinct activations.

A first difference among the operations of FIGS. 7A-C is how the transition from four distinct activations to two distinct activations is performed. FIG. 7A shows that the transition is incremental: (1) at 70 Hz, retaining four distinct activations but shortening the overall amount of emission time (e.g., by shortening all activation periods evenly, or by shortening only the last activation), and (2) then at 60 Hz, dropping to three activations. The process repeats each frame, stretching each activation and/or dropping an activation to fill each emission period.

FIG. 7B shows that the change from four activations per frame to two activations per frame is implemented at once, with the first intermediate frame (e.g., the 70 Hz frame). All the intermediate frames all have two pixel activations, which is the number of activations of the 120 Hz refresh rate operating mode. The display device may size each set of two activations to fill their corresponding emission time period, such that the activations may be different lengths for different intermediate frames. The sizing of the activation may be done evenly (e.g., as illustrated in FIG. 6C), or by sizing a single activation (e.g., as illustrated in FIG. 6B).

FIG. 7C also shows that the change from four activations per frame can be implemented at once, except FIG. 7C illustrates the change occurring at an end of the transition instead of at the beginning.

While FIGS. 7A and 7B show an incremental change in refresh period with each intermediate frame during the transition from 60 Hz to 120 Hz, FIG. 7C illustrates that the change in refresh rate can be implemented at once. For example, 7C shows that the refresh rate remains at 60 Hz while the scan rate changes incrementally. Then, at an end of the transition, the refresh rate changes to 120 Hz.

A benefit to operating a display as illustrated in FIG. 7C is that the SoC may be able to readily provide frames that are timed properly to two discrete refresh rates (e.g., 60 Hz and 120 Hz). A SoC may have to perform additional processing (e.g., frame interpolation) in order to generate frames appropriately timed for display during a multi-step transition between refresh rates, such as the transitions illustrated in FIGS. 7A-B.

While FIGS. 4A through 7C illustrate a transition from a lower refresh rate to a higher refresh rate, a transition from the higher refresh rate to the lower refresh rate may involve the same operations, just reversed in order. For example, a transition from a higher refresh rate to a lower refresh rate may be performed by stepping through the frames referenced by the table of FIG. 5B, in order from right to left.

FIGS. 8A-D show a flowchart of a process for scanning image data to an array of pixels, at an intermediate scan rate during a transition between different refresh rates. The process may be performed by the display system 100 (FIG. 1) and components thereof.

At box 810, the display system receives a first frame of image content. For example, the display driver circuit 106 receives a frame of image content from the SoC 105 and stores the frame of image content in the GRAM 162. The frame is also received line-by-line by the display panel 104.

At box 812, the array of pixels 112 is initialized. For example, the scan drivers may activate a SCAN[n−1] line (not shown in FIG. 1, see FIG. 2B) of each row of pixels successively one after another, in order to initialize (e.g., erase) the image data value stored by each pixel in the array.

At box 814, the first frame of image content is programmed to the array of pixels, by scanning the first frame of image content line-by-line to the array of pixels at a first scan rate. For example, the display driver circuit 106 may send image data values for a first row of a current frame of image content to the data lines D1-D3, and the display driver circuit 106 may thereafter send a signal to the scan drivers 108 to cause the scan drivers 108 to activate a first scan line, for example, the SCAN1 line. Activating a scan line by supplying an "on" signal to the scan line causes a Pixels P11, P21, and P31 to perform operations to move the image data values stored on data lines D1-D3 to the Pixels P11, P21, and P31. This process may repeat for each successive row of the frame of image content (e.g., by activating SCAN2, then SCAN3, and then SCAN4).

A rate at which the display device cycles from activating one SCAN[n] line to a next SCAN[n] line—and also from one SCAN[n−1] line to a next SCAN[n−1] line—is defined by a scan rate of the display panel 104. The scan rate of the display panel may correspond to a frequency of a clock signal generated by the clock signal generator 136, or a multiple of the frequency of the clock signal (e.g., every two clock cycles a next SCAN[n] line is activated).

At box 818, the array of pixels is activated to present the first frame of image content that was scanned to the array of pixels at the first scan rate. For example, the display driver circuit 106 may send a signal to the emission drivers 109 to cause the emission drivers 109 to successively activate each emission line, one at a time. For example, the emission drivers 109 may activate line E1, then line E2, then line E3, and then line E4. Activating a line causes the pixels in the corresponding row to activate and emit light at intensities specified by the data value programmed to each pixel in the row.

At box 819, the display panel 104 may present the frame with a first number of distinct activations over an emission time period for a single frame. For example, the emission drivers 109 may scan a momentary "off" period across the emission lines E1-E4 one or more times during a frame. A length of the one or more momentary "off" periods can affect an overall intensity of the display, and may be used by the SoC 105 to implement screen-wide dimming.

In some implementations, the operations of boxes 810-819 may occur while the display device is operating at a 60 Hz refresh rate, and the number of distinct activations per emission period may be four (as illustrated in FIGS. 7A-C). The display device can operate at a different first refresh rate, for example, any refresh rate between 55 Hz and 95 Hz. In some implementations, the first refresh rate is 82.5 Hz (and the second refresh rate to be discussed below is 165 Hz).

At box 820, a computing device determines whether to transition to a second refresh rate. During steady state operation, the result to this determination is "no" and the display driver circuit 106 will continue to repeat the operations of the boxes in FIG. 8A with each frame supplied to the display driver circuit 106 by the SoC 105.

The computing device may determine to transition to a second refresh rate (the "yes" branch in FIG. 8A) when a type of visual content being displayed by the computing device is about to change. For example, a computing device in which the display system 100 is installed may receive user input that launches a video game. In response, the SoC 105 may send a signal to the display driver circuit 106 indicating that operation of the display driver circuit 106 is to switch to a different refresh rate (e.g., from 60 Hz to 120 Hz), and that the SoC 105 will begin supplying frames of image content at twice the rate (e.g., 120 frames a second instead of 60 frames a second). Responsive to such a "yes" determination, the operations of the FIG. 8B flowchart are performed.

At box 830, the computing device identifies a progression of intermediate frames of image content. For example, the SoC 105 may identify stored instructions that indicate that the computing device is to transition from 60 Hz to 120 Hz using nine intermediate frames, as illustrated in FIG. 5B. The stored instructions may additionally or alternatively be implemented by the logic circuitry 160.

At box 832, the computing device identifies a sequence of scan rates for the progression of the intermediate frames. For example, the SoC 105 or the logic circuitry 160 may include instructions that identify the nine intermediate scan rates illustrated in FIG. 5B.

At box 834, the computing device identifies a sequence of refresh rates for the progression of intermediate frames. For example, the SoC 105 or the logic circuitry 160 may include instructions that identify the nine intermediate frame lengths (or their corresponding refresh rates) that are illustrated in FIG. 5B.

At box 836, the computing device identifies one or more gammas for the progression of intermediate frames. For example, the SoC 105 or the logic circuitry 160 may include instructions that identify the nine intermediate gammas that are illustrated in FIG. 5B, the variations in which there is one or more transitions between gammas during the transition period.

At box 840, the display system receives an intermediate frame of image content. For example, the display driver circuit 106 receives a frame of image content from the SoC 105 and stores the frame of image content in the GRAM 162. The frame that is received and stored may be a next frame, in a sequence of frames, after the most-recent instance of a first frame from the looping operations of the boxes in FIG. 8A.

At box 842, the array of pixels 112 is initialized. For example, the scan drivers may activate the SCAN[n−1] line of each row of pixels (not shown in FIG. 1), successively one after another, in order to erase/initialize the image data value stored at each pixel in the array.

At box 844, the intermediate frame of image content is programmed to the array of pixels 112, by scanning the intermediate frame of image content line-by-line to the array of pixels at an intermediate scan rate. The operations involved in scanning the intermediate frame of image content to the array of pixels 112 may be the same as those described with respect to the first refresh rate, except in part that the scan rate may be an intermediate scan rate that is greater than the above-described first scan rate but less than a second scan rate to which the display device is transitioning.

At box 846, the display device may operate at an intermediate refresh rate for the intermediate frame. For example, a length of time that passes between when a VSync signal that begins the intermediate frame and a VSync signal that ends the intermediate frame may be a length of time that corresponds to a frequency between the first refresh rate and the second refresh rate (e.g., even though the display device may only output a single intermediate frame at the length of time).

At box 848, the array of pixels is activated to present the intermediate frame of image content that was scanned to the array of pixels at the intermediate scan rate. For example, the display driver circuit 106 may send a signal to the emission drivers 109 to cause the emission drivers 109 to successively activate each emission line, one at a time.

At box 849, the display panel 104 may present the intermediate frame with an intermediate number of distinct activations over an emission time period for a single frame. For example, the emission drivers 109 may activate each row of pixels three times during the intermediate frame.

At box 850, the computing device determines whether to transition to another intermediate frame. In examples in which the transition from the first refresh rate to the second refresh rate includes multiple intermediate frames (e.g., as illustrated in FIG. 5B), the result to this determination is "yes" and the display driver circuit 106 may continue to repeat the operations of boxes 840-849 for each intermediate frame (e.g., potentially using unique operating characteristics for each frame, as illustrated in FIG. 5B).

Figure 8A:
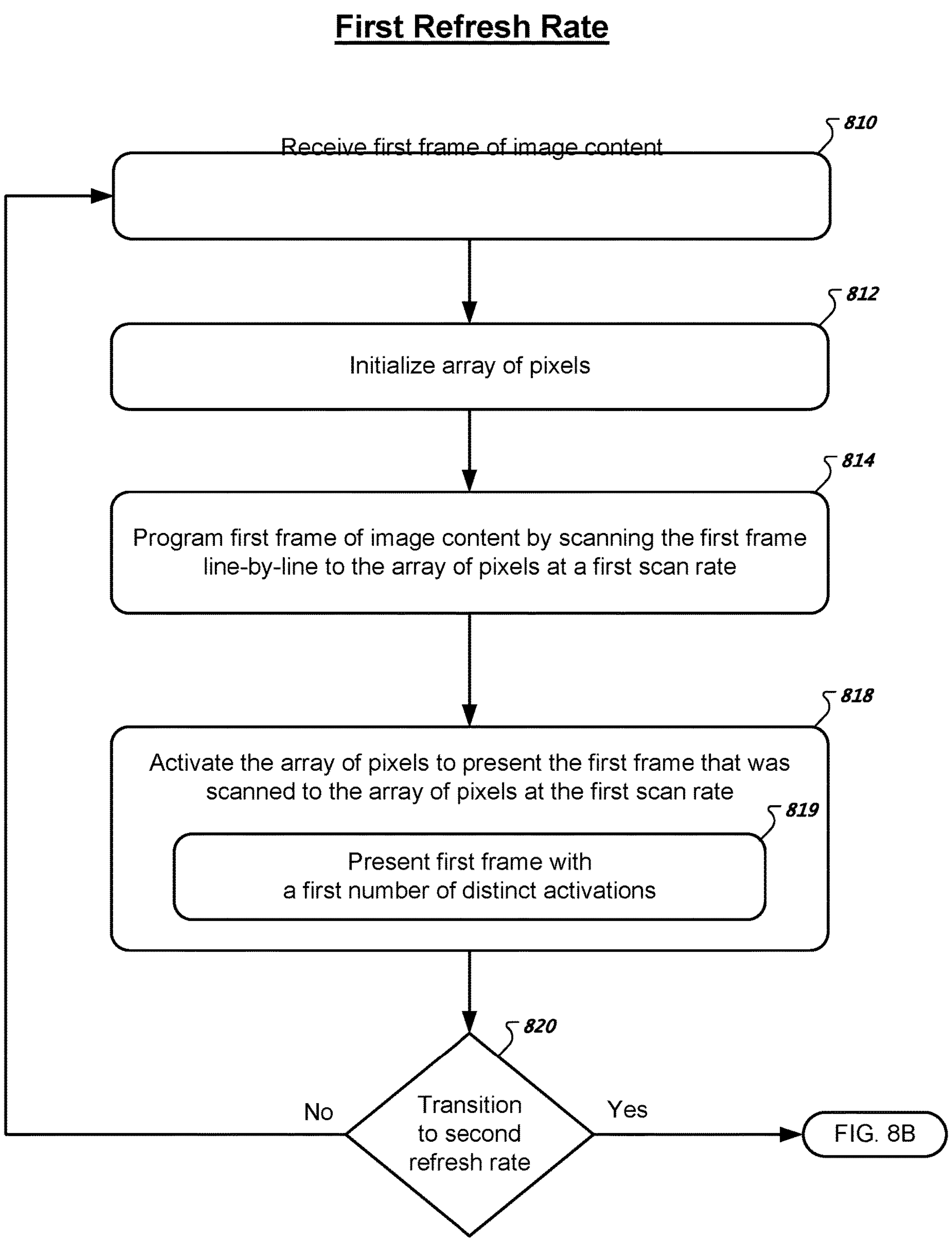
FIGS. 8A-D show a flowchart of a process for scanning image data to an array of pixels at an intermediate scan rate during a transition between different refresh rates.
Figure 8B:
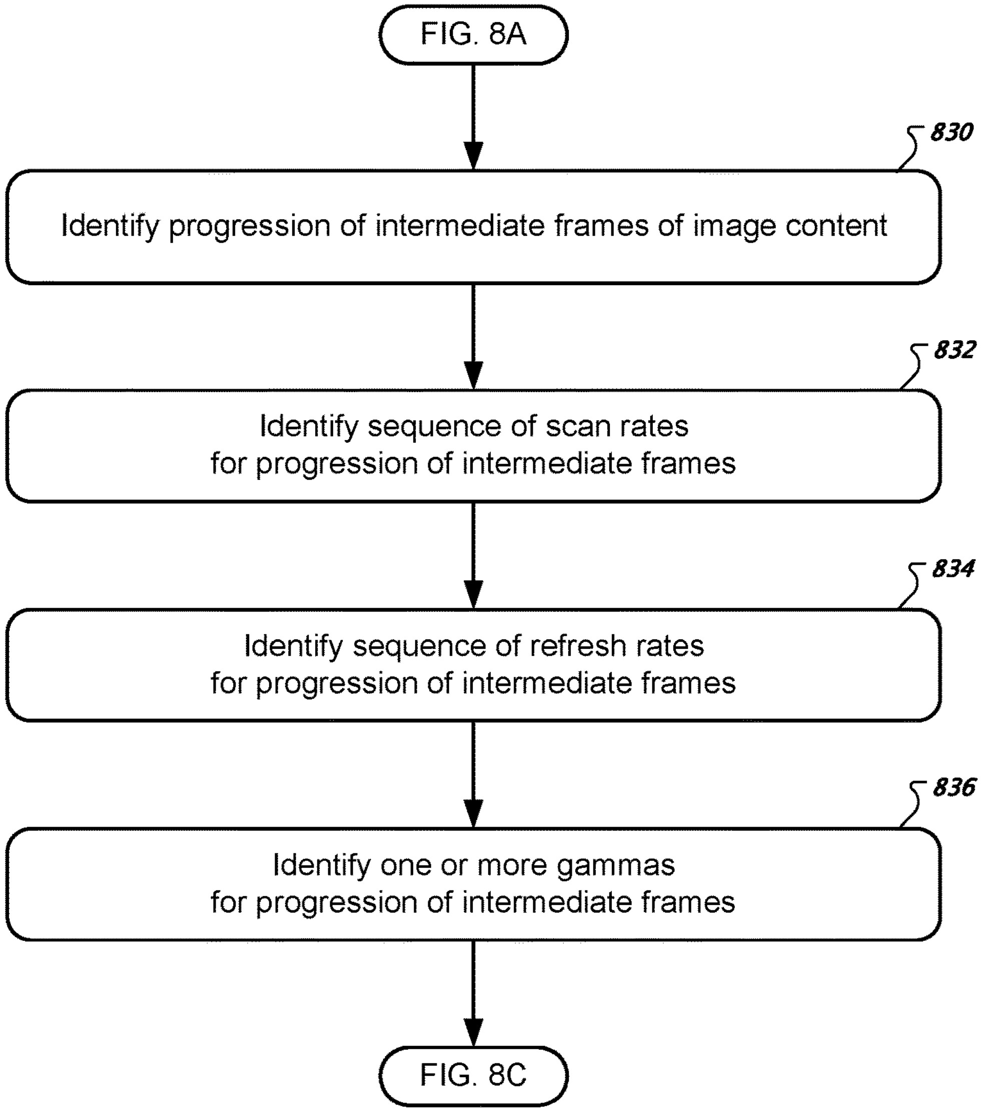
Figure 8C:
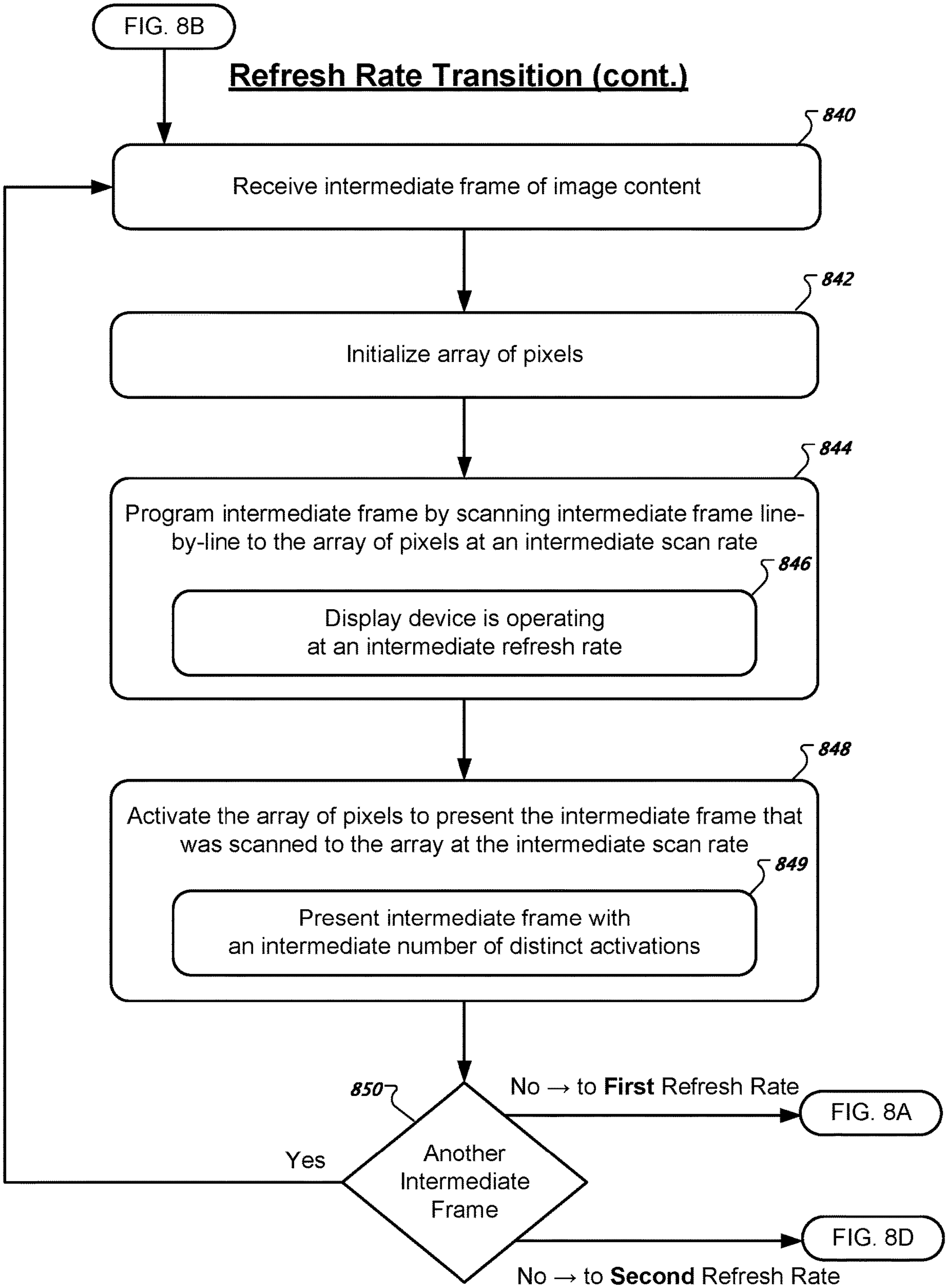
Figure 8D:
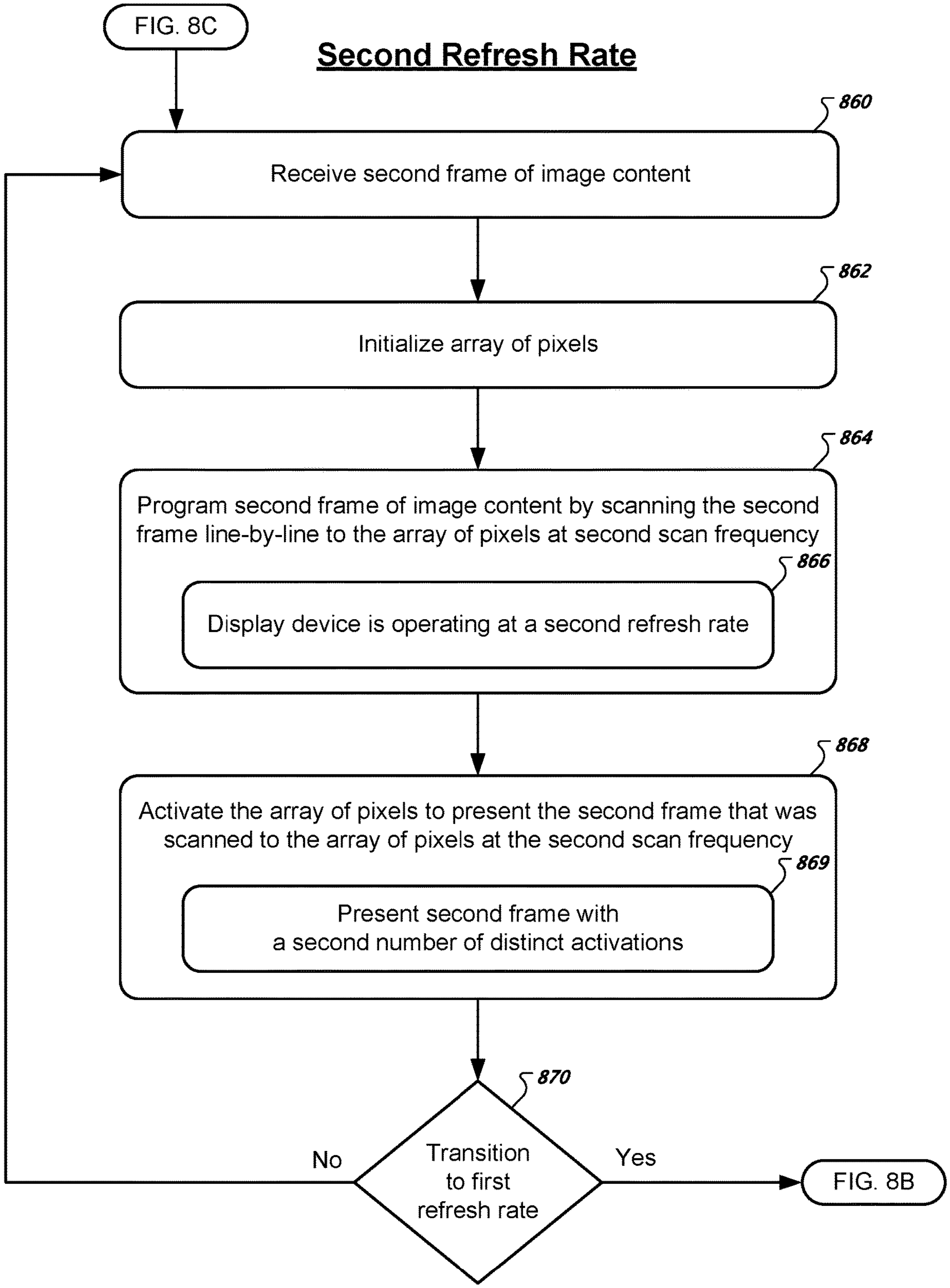

Should there be no additional intermediate frame (e.g., because the current intermediate frame is a last intermediate frame of the transition), the computing device may transition to the operations of FIG. 8D. (The "No→to First Refresh Rate" branch in FIG. 8C is for intermediate frame operations when transitioning from the second refresh rate back to the first refresh rate, as illustrated in FIG. 8D.)

At box 860, the display system receives a second frame of image content. For example, the display driver circuit 106 receives a frame of image content from the SoC 105 and stores the frame of image content in the GRAM 162. The second frame is also received line-by-line by the display panel 104.

At box 862, the array of pixels 112 is initialized. For example, the scan drivers may activate the SCAN[n−1] line of each row of pixels successively one after another, in order to initialize the image data value stored by each pixel in the array.

At box 864, the second frame of image content is programmed to the array of pixels, by scanning the second frame of image content line-by-line to the array of pixels at a second scan rate. The second scan rate may be greater than the first scan rate and all intermediate scan rates, and may be a multiple of the first scan rate.

At box 866, the display device may be operating at a second refresh rate. The second refresh rate may be greater than the first refresh rate, and may be a multiple of the first refresh rate (e.g., 120 Hz).

At box 868, the array of pixels is activated to present the second frame of image content that was scanned to the array of pixels 112 at the second scan rate.

At box 869, the display panel 104 may present the second frame with a second number of distinct activations over an emission time period for a single frame. For example, the second frame may be presented with two distinct activations At box 870, the computing device determines whether to transition to the first refresh rate. During steady state operation, the result to this determination is "no" and the display driver circuit 106 will continue to repeat the operations of the boxes in FIG. 8C with each frame supplied to the display driver circuit 106 by the SoC 105.

The computing device may determine to transition to the first refresh rate (the "yes" branch in FIG. 8B) when a type of visual content being displayed by the computing device is about to change. For example, the computing device may receive user input that ends a video game and transitions the computing device user interface to a static image of home screen icons. In response, the SoC 105 may send a signal to the display driver circuit 106 indicating that operation of the display driver circuit 106 is to switch to a different refresh rate (e.g., from 120 Hz to 60 Hz), and that the SoC 105 will begin supplying frames of image content at half the rate (e.g., 60 frames a second instead of 120 frames a second). Responsive to such a "yes" determination, the operations of the FIG. 8C flowchart are performed (leaving FIG. 8C through the branch that leads to FIG. 8A).

Figure 9:
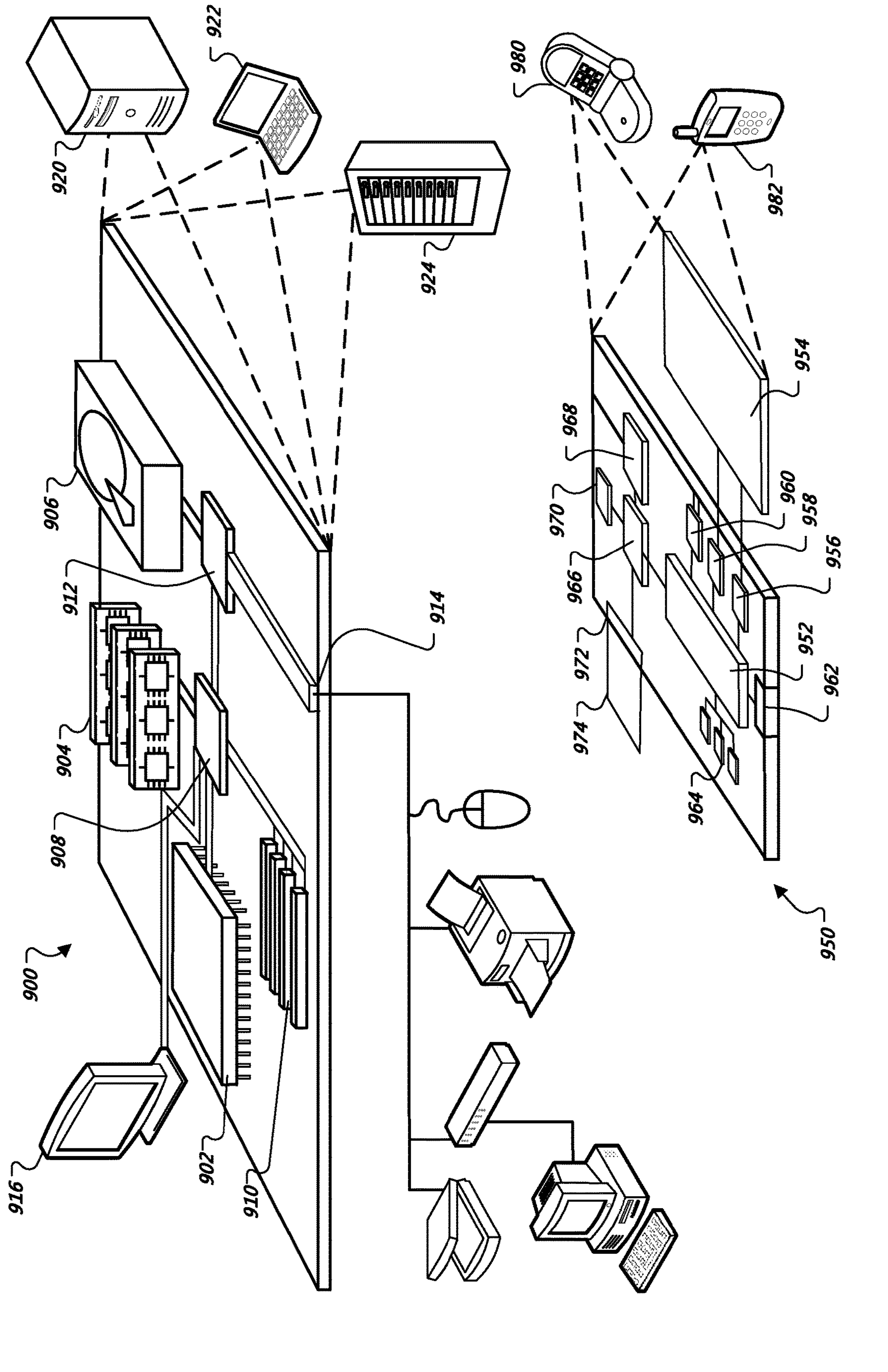
FIG. 9 is a block diagram of computing devices that may be used to implement the systems and methods described in this document, as either a client or as a server or plurality of servers.

FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 900 includes a processor 902, memory 904, a storage device 906, a high-speed controller 908 connecting to memory 904 and high-speed expansion ports 910, and a low speed controller 912 connecting to low speed expansion port 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed controller 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low speed controller 912 manages lower bandwidth-intensive operations. Such allocation of functions is an example only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provided, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Additionally computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method of operating a display device that includes an array of pixels, the method comprising:

programming a first frame of image content to the array of pixels, while the display device is operating at a first refresh rate in which image content presented by the array of pixels is refreshed at the first refresh rate, including by scanning the first frame of image content line-by-line to the array of pixels at a first scan rate;

activating the array of pixels to present the first frame of image content that was scanned to the array of pixels at the first scan rate;

receiving an indication that the display device is to transition from the first refresh rate to a second refresh rate in which image content presented by the array of pixels is refreshed at the second refresh rate;

programming, responsive to receiving the indication that the display device is to transition from the first refresh rate to the second refresh rate, an intermediate frame of image content to the array of pixels, including by scanning the intermediate frame of image content line-by-line to the array of pixels at an intermediate scan rate that is between the first scan rate and a second scan rate;

activating the array of pixels to present the intermediate frame of image content that was scanned to the array of pixels at the intermediate scan rate, wherein:

the display device presents a first line of the intermediate frame of image content by activating a first line of the array of pixels for a first amount of time; and the display device presents a second line of the intermediate frame of image content by activating a second line of the array of pixels for a second amount of time that is different from the first amount of time;

programming a second frame of image content to the array of pixels, after the display device has presented the intermediate frame of image content and while the display device is operating at the second refresh rate, including by scanning the second frame of image content line-by-line to the array of pixels at the second scan rate; and activating the array of pixels to present the second frame of image content that was scanned to the array of pixels at the second scan rate.

2. The method of claim 1, wherein:

the first frame, the intermediate frame, and the second frame are frames in a sequence of frames presented by the display device.

3. The method of claim 1, wherein:

scanning the first frame of image content line-by-line to the array of pixels at the first scan rate includes:

(i) scanning a first line of the first frame of image content to a first line of the array of pixels at a first time; and (ii) scanning a second line of the first frame of image content to a second line of the array of pixels at a second time; and a difference between the first time and the second time is defined by the first scan rate.

4. The method of claim 1, wherein:

the first refresh rate is lower than the second refresh rate;

the first scan rate is lower than the intermediate scan rate; and the second scan rate is higher than the intermediate scan rate.

5. The method of claim 4, wherein:

the first refresh rate is a frequency between 60 Hz and 100 Hz; and the second refresh rate is twice the first refresh rate.

6. The method of claim 1, wherein:

the display device presents the first frame of image content with a first number of distinct activations; and the display device presents the second frame of image content with a second number of distinct activations that is less than the first number of distinct activations.

7. The method of claim 6, wherein:

the display device presents the intermediate frame of image content with an intermediate number of refresh periods that is less than the first number of distinct activations and greater than the second number of distinct activations.

8. The method of claim 7, wherein:

the first number of distinct activations is four activations;

the intermediate number of distinct activations is three activations; and the second number of distinct activations is two activations.

9. The method of claim 1, comprising:

receiving an indication that the display device is to transition from the second refresh rate back to the first refresh rate;

programming, responsive to receiving the indication that the display device is to transition from the second refresh rate back to the first refresh rate, an additional intermediate frame of image content to the array of pixels, including by scanning the additional intermediate frame of image content line-by-line to the array of pixels at the intermediate scan rate;

activating the array of pixels to present the additional intermediate frame of image content that was scanned to the array of pixels at the intermediate scan rate;

programming an additional first frame of image content to the array of pixels, while the display device is operating at the first refresh rate, including by scanning the additional first frame of image content line-by-line to the array of pixels at the first scan rate; and activating the array of pixels to present the additional first frame of image content that was scanned to the array of pixels at the first scan rate.

10. The method of claim 1, wherein:

programming the intermediate frame of image content to the array of pixels is performed while the display device is operating at an intermediate refresh rate that is between the first refresh rate and the second refresh rate.

11. The method of claim 1, comprising, after the display device presents the first frame of image content and before the display device presents the second frame of image content:

programming a second intermediate frame of image content to the array of pixels, including by scanning the second intermediate frame of image content line-by-line to the array of pixels at a second intermediate scan rate that is between the first scan rate and the second scan rate;

activating the array of pixels to present the second intermediate frame of image content that was scanned to the array of pixels at the second intermediate scan rate;

programming a third intermediate frame of image content to the array of pixels, including by scanning the third intermediate frame of image content line-by-line to the array of pixels at a third intermediate scan rate that is between the first scan rate and the second scan rate; and activating the array of pixels to present the third intermediate frame of image content that was scanned to the array of pixels at the third intermediate scan rate.

12. The method of claim 11, wherein:

the intermediate scan rate, the second intermediate scan rate, and the third intermediate scan rate represent a sequence of different scan frequencies between the first scan rate and the second scan rate.

13. The method of claim 12, wherein:

a difference between the intermediate scan rate and the second intermediate scan rate is same as a difference between the second intermediate scan rate and the third intermediate scan rate.

14. The method of claim 12, wherein:

programming the intermediate frame of image content to the array of pixels is performed while the display device is operating at a first intermediate refresh rate that is between the first refresh rate and the second refresh rate;

programming the second intermediate frame of image content to the array of pixels is performed while the display device is operating at a second intermediate refresh rate that is between the first refresh rate and the second refresh rate; and programming the third intermediate frame of image content to the array of pixels is performed while the display device is operating at a third intermediate refresh rate that is between the first refresh rate and the second refresh rate.

15. The method of claim 1, comprising:

applying a first gamma to the first frame of image content, the first gamma being a gamma designated for the first refresh rate;

applying an intermediate gamma to the intermediate frame of image content; and applying a second gamma to the second frame of image content, the second gamma being a gamma designated for the second refresh rate.

16. A method of operating a display device that includes an array of pixels, the method comprising:

programming a first frame of image content to the array of pixels, while the display device is operating at a first refresh rate in which image content presented by the array of pixels is refreshed at the first refresh rate, including by scanning the first frame of image content line-by-line to the array of pixels at a first scan rate;

activating the array of pixels to present the first frame of image content that was scanned to the array of pixels at the first scan rate;

receiving an indication that the display device is to transition from the first refresh rate to a second refresh rate in which image content presented by the array of pixels is refreshed at the second refresh rate, wherein prior to receiving the indication that the display device is to transition from the first refresh rate to the second refresh rate, the display device programmed and presented a first series of at least one-hundred frames of image content at the first refresh rate, including the programming and presenting of the first frame of image content;

programming, responsive to receiving the indication that the display device is to transition from the first refresh rate to the second refresh rate, an intermediate frame of image content to the array of pixels, including by scanning the intermediate frame of image content line-by-line to the array of pixels at an intermediate scan rate that is between the first scan rate and a second scan rate;

activating the array of pixels to present the intermediate frame of image content that was scanned to the array of pixels at the intermediate scan rate;

programming a second frame of image content to the array of pixels, after the display device has presented the intermediate frame of image content and while the display device is operating at the second refresh rate, including by scanning the second frame of image content line-by-line to the array of pixels at the second scan rate; and activating the array of pixels to present the second frame of image content that was scanned to the array of pixels at the second scan rate, wherein after presenting the intermediate frame of image content, the display device presented a second series of at least one-hundred frames of image content at the second refresh rate, including the programming and presenting of the second frame of image content.

17. The method of claim 16, wherein:

the programming of the first series of at least one-hundred frames of image content included scanning each frame of image content of the first series of at least one-hundred frames of image content line-by-line to the array of pixels at the first scan rate; and the programming of the second series of at least one-hundred frames of image content included scanning each frame of image content of the second series of at least one-hundred frames of image content line-by-line to the array of pixels at the second scan rate.

18. The method of claim 16, wherein:

the programming of the intermediate frame of image content is an only frame of image content scanned to the array of pixels at the intermediate scan rate, between the display device presenting the first frame of image content and the display device presenting the second frame of image content.

19. A display system, comprising:

a display device that includes an array of pixels; and circuitry that is configured to:

program a first frame of image content to the array of pixels, while the display device is operating at a first refresh rate in which image content presented by the array of pixels is refreshed at the first refresh rate, including by scanning the first frame of image content line-by-line to the array of pixels at a first scan rate;

activate the array of pixels to present the first frame of image content that was scanned to the array of pixels at the first scan rate;

receive an indication that the display device is to transition from the first refresh rate to a second refresh rate in which image content presented by the array of pixels is refreshed at the second refresh rate;

program, responsive to receiving the indication that the display device is to transition from the first refresh rate to the second refresh rate, an intermediate frame of image content to the array of pixels, including by scanning the intermediate frame of image content line-by-line to the array of pixels at an intermediate scan rate that is between the first scan rate and a second scan rate;

activate the array of pixels to present the intermediate frame of image content that was scanned to the array of pixels at the intermediate scan rate, wherein:

the display device presents a first line of the intermediate frame of image content by activating a first line of the array of pixels for a first amount of time; and the display device presents a second line of the intermediate frame of image content by activating a second line of the array of pixels for a second amount of time that is different from the first amount of time;

program a second frame of image content to the array of pixels, after the display device has presented the intermediate frame of image content and while the display device is operating at the second refresh rate, including by scanning the second frame of image content line-by-line to the array of pixels at the second scan rate; and activate the array of pixels to present the second frame of image content that was scanned to the array of pixels at the second scan rate.

20. A display system, comprising:

a display device that includes an array of pixels; and circuitry that is configured to:

program a first frame of image content to the array of pixels, while the display device is operating at a first refresh rate in which image content presented by the array of pixels is refreshed at the first refresh rate, including by scanning the first frame of image content line-by-line to the array of pixels at a first scan rate;

activate the array of pixels to present the first frame of image content that was scanned to the array of pixels at the first scan rate;

receive an indication that the display device is to transition from the first refresh rate to a second refresh rate in which image content presented by the array of pixels is refreshed at the second refresh rate, wherein prior to receiving the indication that the display device is to transition from the first refresh rate to the second refresh rate, the display device programmed and presented a first series of at least one-hundred frames of image content at the first refresh rate, including the programming and presenting of the first frame of image content;

program, responsive to receiving the indication that the display device is to transition from the first refresh rate to the second refresh rate, an intermediate frame of image content to the array of pixels, including by scanning the intermediate frame of image content line-by-line to the array of pixels at an intermediate scan rate that is between the first scan rate and a second scan rate;

activate the array of pixels to present the intermediate frame of image content that was scanned to the array of pixels at the intermediate scan rate;

program a second frame of image content to the array of pixels, after the display device has presented the intermediate frame of image content and while the display device is operating at the second refresh rate, including by scanning the second frame of image content line-by-line to the array of pixels at the second scan rate; and activate the array of pixels to present the second frame of image content that was scanned to the array of pixels at the second scan rate, wherein after presenting the intermediate frame of image content, the display device presented a second series of at least one-hundred frames of image content at the second refresh rate, including the programming and presenting of the second frame of image content.

* * * * *